US012647260B2

(12) United States Patent
Wang

(10) Patent No.: US 12,647,260 B2
(45) **Date of Patent: *Jun. 2, 2026**

(54) QUANTUM SECURE COMMUNICATION PROTOCOL AND DEVICE BASED ON COMPOSITE MULTI-LAYER ENCODING

(71) Applicant: Homatch.ai, Milpitas, CA (US)

(72) Inventor: Mingjun Wang, Saratoga, CA (US)

(73) Assignee: Homatch.ai, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/337,685

(22) Filed: Sep. 23, 2025

(65) Prior Publication Data

US 2026/0106739 A1     Apr. 16, 2026

Related U.S. Application Data

(63) Continuation-in-part of application No. 19/208,461, filed on May 14, 2025, now Pat. No. 12,452,047.

(60) Provisional application No. 63/707,201, filed on Oct. 15, 2024.

(51) Int. Cl.
*H04L 9/08*          (2006.01)
(52) U.S. Cl.
CPC ................................. *H04L 9/0858* (2013.01)
(58) Field of Classification Search
CPC ...................................................... H04L 9/0858
See application file for complete search history.

(56) References Cited

U.S. PATENT DOCUMENTS

| | | | |
|---|---|---|---|
| 9,077,577 B1 | 7/2015 | Ashrafi et al. | |
| 10,148,360 B2 * | 12/2018 | Ashrafi | ................. H04B 10/70 |
| 10,506,312 B1 * | 12/2019 | Innes | ................. H04Q 11/0066 |
| 10,708,046 B1 | 7/2020 | Ashrafi | |
| 11,329,810 B2 * | 5/2022 | Li | ........................... H04B 10/70 |
| 11,438,149 B2 * | 9/2022 | Chen | ..................... H04L 9/0827 |
| 12,452,047 B1 * | 10/2025 | Wang | ..................... H04L 9/0852 |
| 2020/0050959 A1 | 2/2020 | Ashrafi | |
| 2021/0133614 A1 * | 5/2021 | Ashrafi | ..................... G02F 3/00 |
| 2023/0006719 A1 * | 1/2023 | Ashrafi | ................. H04B 7/0413 |
| 2024/0089124 A1 * | 3/2024 | Hong | ..................... H04L 9/0852 |

(Continued)

OTHER PUBLICATIONS

Ndagano et al.; "Creation and Detection of Vector Vortex Modes for Classical and Quantum Communication", Jan. 2018, Journal of Lightwave Technology, vol. 36, No. 2, pp. 292-301. (Year: 2018).*

(Continued)

*Primary Examiner* — Taghi T Arani
(74) *Attorney, Agent, or Firm* — MASCHOFF BRENNAN; Paul G. Johnson

(57)          ABSTRACT
A method for secure quantum communication includes generating a photon. The method includes modulating at least two quantum state dimensions selected from the group consisting of orbital angular momentum (OAM), polarization, and phase of the photon to form a composite quantum state. The method includes directing the photon to an emission point on a structure having a defined spatial coordinate corresponding to classical data. The method includes emitting the photon from the emission point into a quantum channel. The composite quantum state and emission-point spatial coordinate jointly encode secure quantum information for transmission.

20 Claims, 7 Drawing Sheets

Photon System   112

Polarization Modulator
168

OAM Modulator
166

Phase Modulator
164

Quantum Photon Emitter
162

Photon Generation and Control System
160

(56)         References Cited

U.S. PATENT DOCUMENTS

2024/0241288 A1      7/2024   Capasso et al.

OTHER PUBLICATIONS

Forbes, Andrew; "Controlling light's helicity at the source: orbital angular momentum states from lasers", 2017, royalsocietypublishing. org, Phil. Trans. R. Soc. A 375: 20150436, pp. 1-14. (Year: 2017).*
Mi et al., "High-Capacity Quantum Secure Direct Communication With Orbital Angular Momentum of Photons", 2015, IEEE Photonics Journal, vol. 7, No. 5, pp. 1-9. (Year: 2015).
International Search report and Written Opinion issued on Apr. 10, 2026 in PCT application No. PCT/US2025/029646, 9 Pages.

* cited by examiner

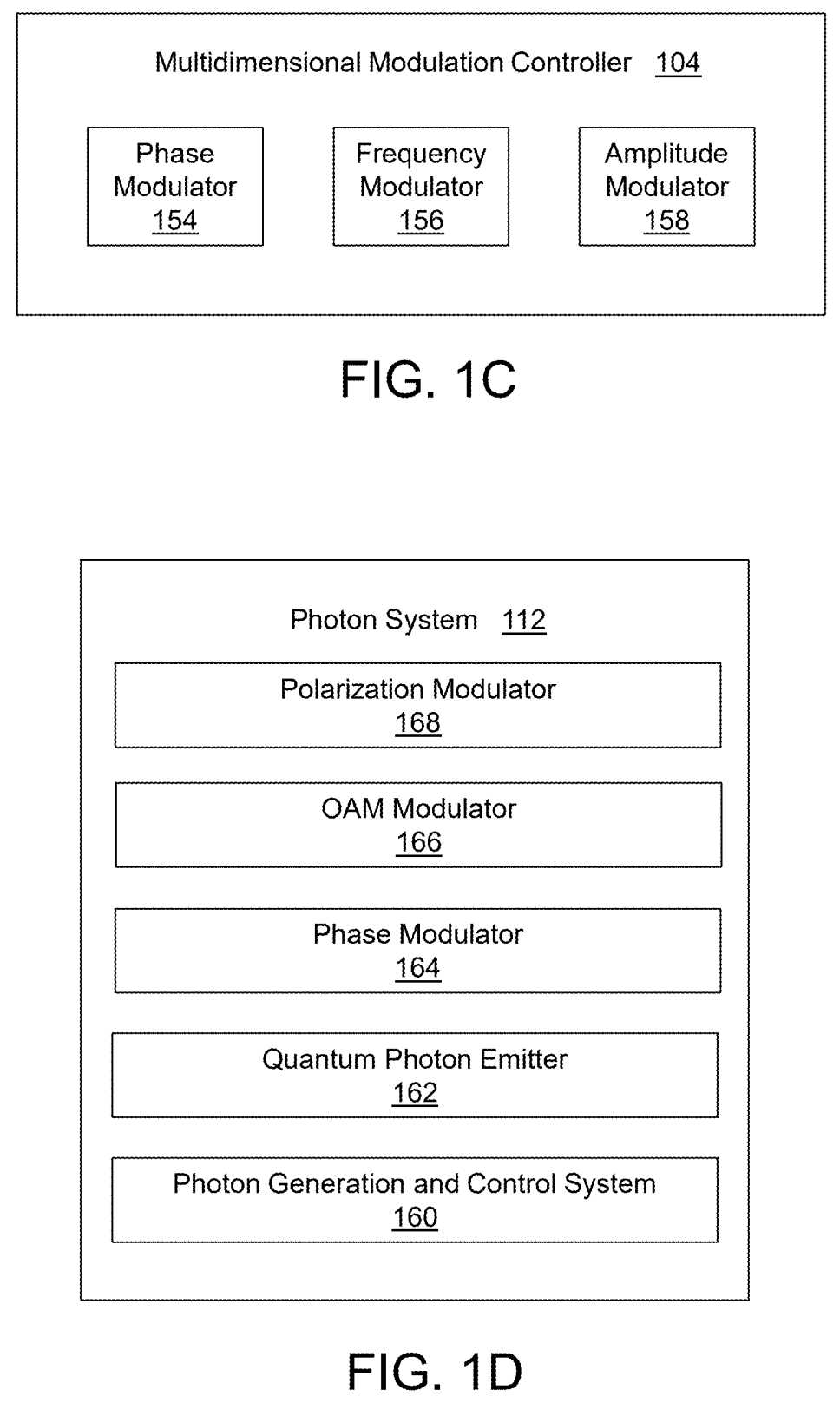

Multidimensional Modulation Controller   104

| Phase Modulator 154 | Frequency Modulator 156 | Amplitude Modulator 158 |

FIG. 1C

Photon System   112

Polarization Modulator
168

OAM Modulator
166

Phase Modulator
164

Quantum Photon Emitter
162

Photon Generation and Control System
160

FIG. 1D

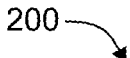

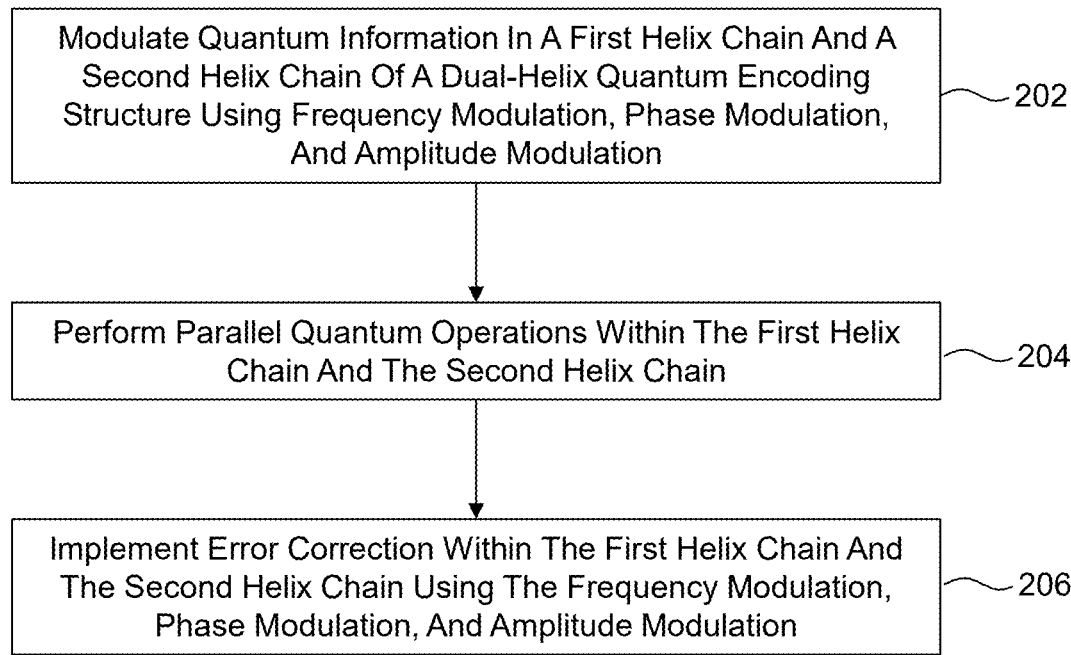

Modulate Quantum Information In A First Helix Chain And A Second Helix Chain Of A Dual-Helix Quantum Encoding Structure Using Frequency Modulation, Phase Modulation, And Amplitude Modulation ~202

Perform Parallel Quantum Operations Within The First Helix Chain And The Second Helix Chain ~204

Implement Error Correction Within The First Helix Chain And The Second Helix Chain Using The Frequency Modulation, Phase Modulation, And Amplitude Modulation ~206

FIG. 2

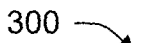
300
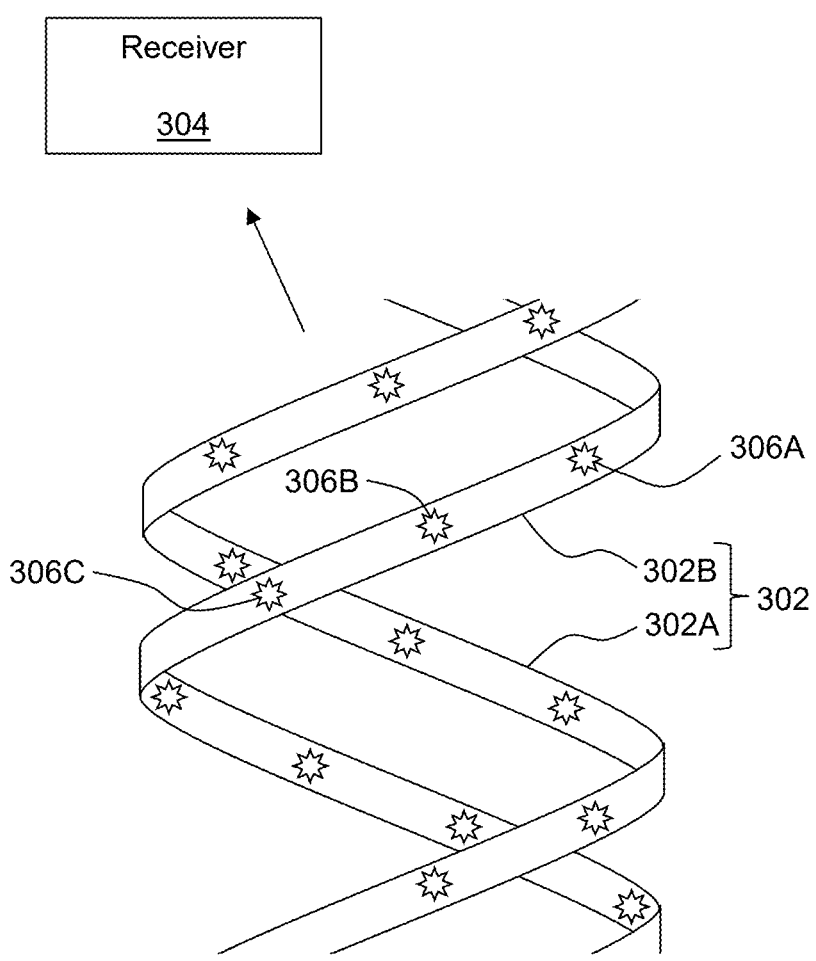
FIG. 3

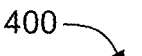

400

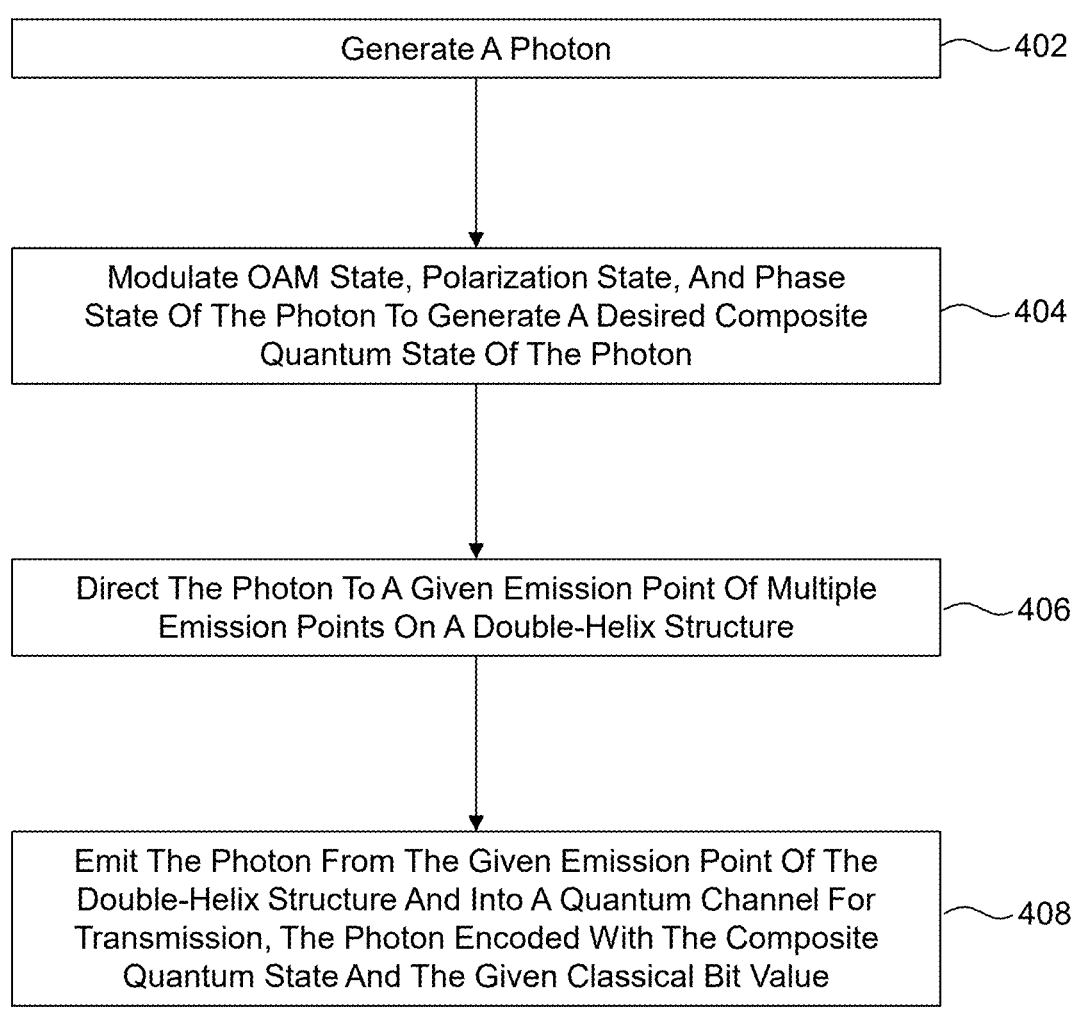

| Generate A Photon | 402 |
| --- | --- |

| Modulate OAM State, Polarization State, And Phase State Of The Photon To Generate A Desired Composite Quantum State Of The Photon | 404 |
| --- | --- |

| Direct The Photon To A Given Emission Point Of Multiple Emission Points On A Double-Helix Structure | 406 |
| --- | --- |

| Emit The Photon From The Given Emission Point Of The Double-Helix Structure And Into A Quantum Channel For Transmission, The Photon Encoded With The Composite Quantum State And The Given Classical Bit Value | 408 |
| --- | --- |

FIG. 4

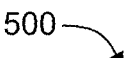

500

| Generate A Photon | 502 |

Encode Information In The Photons Using A
Combination Of Spatial Coordinates And Composite
Quantum States Of The Photons — 504

Assign Classical Information To Emission Points
Distributed Along Helix Chains Of A Double-Helix
Structure, Each Emission Point Having A
Unique Spatial Coordinate — 506

Modulate Composite Quantum States Of The
Photons, Each Composite Quantum State
Including OAM State, Polarization State, And Phase
State Of A Corresponding Photon — 508

Emit The Photons With Modulated Composite
Quantum States From Selected Emission Points Each
Having Assigned Classical Information — 510

FIG. 5

QUANTUM SECURE COMMUNICATION PROTOCOL AND DEVICE BASED ON COMPOSITE MULTI-LAYER ENCODING

RELATED APPLICATION

This application is a continuation-in-part of U.S. application Ser. No. 19/208,461 filed May 14, 2025 which claims the benefit of and priority to U.S. Provisional Application No. 63/707,201 filed Oct. 15, 2024. The entire contents of the 19/208,461 and 63/707,201 applications are hereby incorporated by reference in their entireties.

TECHNICAL FIELD

The present disclosure relates to a quantum secure communication protocol and device based on composite multi-layer encoding.

BACKGROUND

Unless otherwise indicated herein, the materials described herein are not prior art to the claims in the present application and are not admitted to be prior art by inclusion in this section.

Quantum communication offers the potential for ultra-secure information transfer due to the inherent properties of quantum mechanics, such as quantum superposition and entanglement. However, one challenge in the practical implementation of quantum communication is optimizing the amount of information that can be encoded and transmitted efficiently while maintaining security against noise and eavesdropping.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments include a quantum secure communication protocol and a corresponding system based on composite multi-layer encoding. The system may utilize the spatial coordinates of emission points on a structure and the quantum states of photons (such as orbital angular momentum (OAM) state, polarization state, and phase state) to achieve multi-layer encoding. By integrating the geometric features of the structure with quantum information, the system may increase information capacity, enhance security, and improve resistance to interference and errors.

The quantum secure communication protocol may allow for secure quantum key distribution (QKD) and general quantum communication by combining classical and quantum encoding techniques. In some embodiments, the structure includes a double-helix structure and the double-helix structure not only acts as a physical guide for photon transmission but also provides spatial coordinates for encoding classical information. Additionally, the system may enhance security through quantum entanglement, superposition, and randomization of spatial coordinates, reducing vulnerability to eavesdropping.

In an example embodiment, a method for secure quantum communication includes generating a photon. The method includes modulating at least two quantum state dimensions selected from the group consisting of orbital angular momentum (OAM), polarization, and phase of the photon to form a composite quantum state. The method includes directing the photon to an emission point on a structure having a defined spatial coordinate corresponding to classical data. The method includes emitting the photon from the emission point into a quantum channel. The composite quantum state and spatial coordinate together encode secure information.

In another example embodiment, a quantum communication system includes a photon source, at least one modulator, a structure, a control module, and a receiver. The photon source is configured to emit single photons. The modulator is configured to adjust two or more quantum state dimensions selected from OAM, polarization, and phase. The structure has a plurality of emission points with unique spatial coordinates. The control module is configured for selecting emission points based on classical data mapping. The receiver is configured to extract classical and quantum information from received photons.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION

The present application can be best understood by reference to the embodiments described below taken in conjunction with the accompanying drawing figures, in which like parts may be referred to by like numerals.

FIG. 1C illustrates an example implementation of a multidimensional modulation controller included in the quantum computing system of FIG. 1A.

FIG. 1D illustrates an example implementation of a photon system included in the quantum computing system of FIG. 1A.

FIG. 2 depicts a flowchart of a method for quantum computing.

FIG. 3 illustrates an example quantum communication system that may be implemented for secure quantum communication.

FIG. 4 depicts a flowchart of a method for secure quantum communication.

FIG. 5 depicts a flowchart of another method for secure quantum communication.

DETAILED DESCRIPTION

Figure 1A:
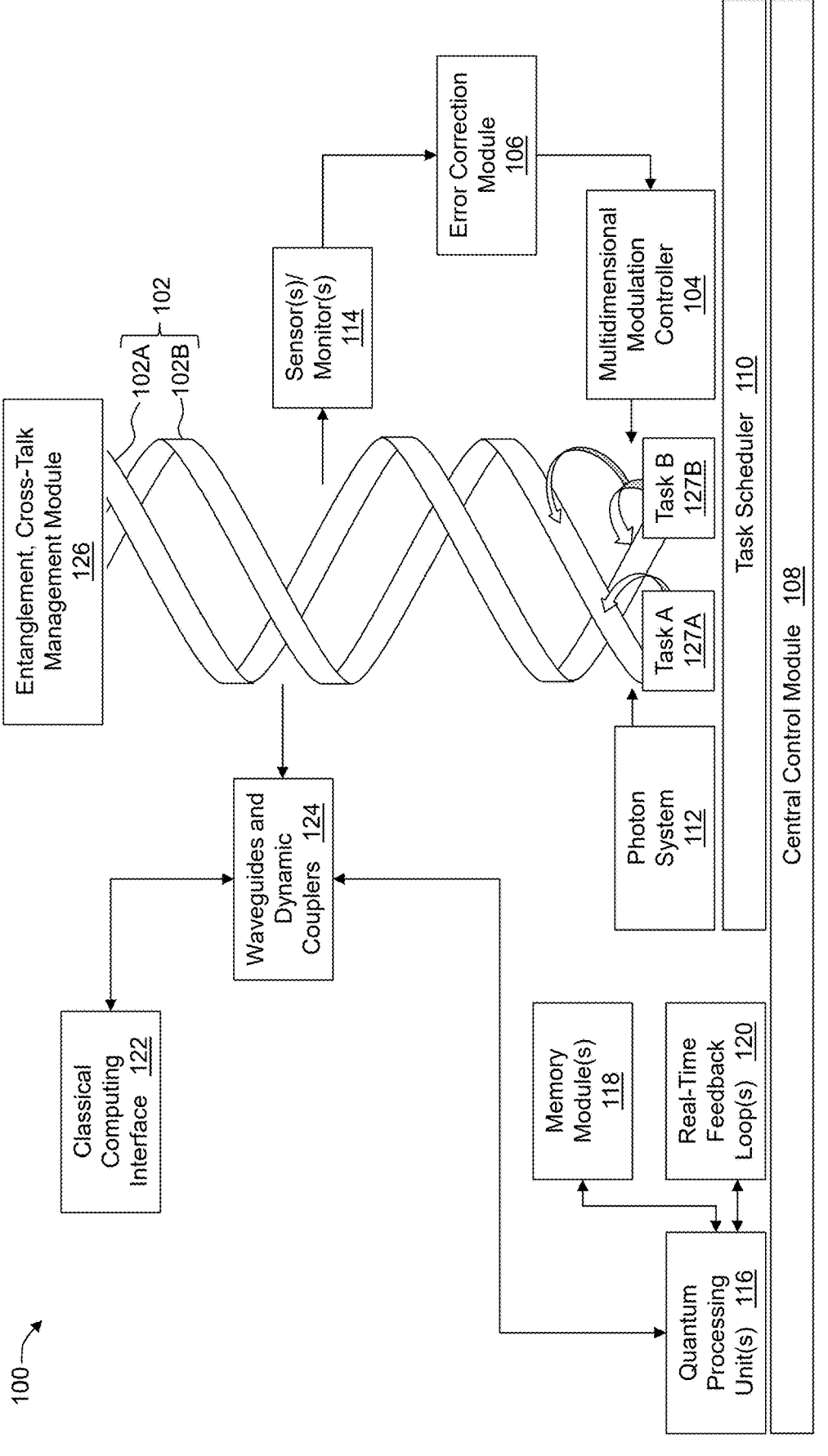
FIG. 1A illustrates an example quantum computing system that includes a double-helix quantum encoding architecture.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

Some quantum communication systems may face challenges related to information capacity, security vulnerabilities, error susceptibility, and practical implementation limitations. Some embodiments herein address these issues through an innovative composite encoding approach and quantum computing system that includes a double-helix structure.

Information density limitations may be overcome through the multi-dimensional encoding scheme of the double-helix structure. Some quantum communication protocols may typically encode only one or two bits of information per photon, limiting the overall information capacity of the quantum communication system. The double-helix structure may enable the encoding of information in multiple dimensions simultaneously-through spatial coordinates of emission points and multiple quantum states (orbital angular momentum, polarization, and phase). This multi-dimensional approach may significantly increase the information density per transmitted photon, potentially improving the efficiency of quantum communication channels.

Vulnerability to noise and interference may be mitigated by the redundancy inherent in the composite encoding scheme. Some quantum communication systems may be highly susceptible to environmental noise, which may cause decoherence and loss of quantum information. The double-helix structure may provide geometric redundancy, allowing for the distribution of information across multiple emission points and quantum states. This redundancy may enhance the double-helix quantum computing system's ability to maintain reliable communication even in noisy environments, as the loss or corruption of information in one dimension may be compensated by information preserved in other dimensions.

Error correction challenges may be addressed through the double-helix quantum computing system's integrated quantum and classical error correction mechanisms. Some quantum error correction techniques may be complex and resource-intensive. The double-helix quantum computing system implements quantum error correction using encoded entangled photo states and spatial multiplexing across emission points. Syndrome measurements and corrections are achieved via photon routing, real-time monitoring, and dynamic adjustment. This dual approach may provide more robust error detection and correction capabilities, ensuring higher fidelity in the transmitted information despite channel imperfections.

Eavesdropping vulnerabilities may be reduced through the multi-layered security features of the double-helix quantum computing system. Some quantum key distribution protocols may be vulnerable to certain types of side-channel attacks or implementation flaws. The double-helix structure may add an additional layer of security through spatial coordinate randomization, making it more difficult for an eavesdropper to intercept the complete information. The combination of spatial coordinates and multiple quantum states may create a more complex encoding scheme that may be more resistant to sophisticated attacks.

Practical implementation issues may be addressed through the double-helix quantum computing system's structured approach to quantum state generation and detection. Some quantum communication systems may face challenges in the precise generation and measurement of quantum states. The double-helix structure may provide a well-defined geometric framework for the emission and detection of photons, potentially improving the alignment and calibration of the double-helix quantum computing system. This structured approach may enhance the reliability and reproducibility of the quantum state generation and measurement processes.

The double-helix quantum computing system may thus provide comprehensive solutions to multiple challenges in quantum communication, advancing the field toward more practical and widespread applications of quantum secure communication technologies.

An example double-helix quantum computing system may include a double-helix structure and one or more of a multi-dimensional quantum modulation system, a parallel processing architecture, or an error tolerance and correction mechanism. For example, the double-helix quantum encoding architecture may encode quantum bits (qubits) within the double-helix structure using multidimensional modulation, which may include modulation of photon energy levels (analogous to frequency), quantum phase, and/or superposition amplitude. The double-helix structure may include two or more helix chains and each helix chain may be capable of storing more quantum information per qubit, while multiple helix chains may operate in parallel. Parallel processing across helix chains may be coordinated using time-bin synchronization and photon delay lines to preserve coherence. Through multi-dimensional quantum modulation (e.g., frequency, phase, and/or amplitude modulation), some embodiments may process and manipulate multiple quantum states simultaneously. In some embodiments, frequency modulation may represent basic quantum states (e.g., $|0\rangle$ and $|1\rangle$), phase modulation may enable quantum superposition and interference control, and amplitude modulation may enhance error correction by enabling redundancy mechanisms. The double-helix structure may inherently support parallel quantum processing, where two or more helix chains execute different quantum tasks concurrently. Information processing within each helix chain may be managed through controlled modulation of frequency, phase, and amplitude, to improve parallel processing capability and/or efficiency. Alternatively or additionally, the architecture may leverage multidimensional modulation to implement an efficient quantum error correction (QEC) mechanism. QEC codes may be applied using entangled photonic states across emission points, with temporal or spatial multiplexing to support syndrome extraction and correction. If one modulation dimension encounters an error (e.g., due to noise or decoherence), other dimensions can compensate for it, reducing the overall impact of quantum errors.

Some embodiments herein include a quantum communication system and method that utilizes a double-helix structure for composite multi-layer encoding of information. The double-helix quantum computing system is an example of and/or may be included in such a quantum communication system. The quantum communication system may combine spatial coordinates of emission points distributed along a helical path of the double-helix structure with multiple quantum states of photons, including orbital angular momentum (OAM), polarization, and phase. This multidimensional approach may increase information density per transmitted photon while potentially enhancing security through spatial coordinate randomization and quantum mechanical principles. Some embodiments may implement various QKD protocols adapted for the double-helix structure. Error correction mechanisms may be employed at both quantum and classical levels to ensure reliable communication even in noisy environments. The combination of spatial encoding and quantum state encoding may create a robust framework for secure quantum communication that may be resistant to eavesdropping attempts and channel disturbances. The double-helix structure may provide geometric redundancy and a well-defined framework for the emission and detection of quantum-encoded photons, potentially improving alignment, calibration, and overall system reliability.

FIG. 1A illustrates an example quantum computing system 100 (hereinafter "system 100") that includes such a double-helix structure, arranged in accordance with at least one embodiment herein. In particular, the system 100 includes a double-helix structure 102 (hereinafter "double-helix structure 102"), a multidimensional modulation controller 104 (hereinafter "controller 104"), and an error correction module 106. The system 100 may further include a central control module 108, a task scheduler 110, a photon system 112, one or more sensors or monitors 114 (hereinafter generically "sensors 114" or "sensor 114"), one or more quantum processing units (QPUs) 116, one or more memory modules 118, one or more real-time feedback loops 120, a classical computing interface 122, one or more waveguides and/or dynamic couplers 124, and an entanglement and cross-talk management module 126 (hereinafter "entanglement module 126").

In general, the double-helix structure 102 may include a first helix chain 102A and a second helix chain 102B. Each of the first helix chain 102A and the second helix chain 102B may include at least one of high-transparency quartz, fused silica, silicon nitride (SiN), lithium niobate (LiNbO$_3$), or other suitable material(s). The controller 104 may be configured to modulate quantum information in the first and second helix chains 102A, 102B using two or more of frequency modulation, phase modulation, and amplitude modulation. The double-helix structure 102 may be configured to perform parallel quantum operations within the first helix chain 102A and the second helix chain 102B, e.g., under the direction or control of one or more of the central control module 108 or the task scheduler 110. The error correction module 106 may be configured to implement error correction within the first and second helix chains 102A, 102B using frequency modulation, phase modulation, and amplitude modulation provided through the controller 104.

The helix chains 102A, 102B may operate in parallel, each processing different quantum tasks simultaneously. The architecture of the system 100 may dynamically assign tasks to different chains 102A, 102B based on the complexity of the computations. In some embodiments, this may ensure balanced load distribution. For example, FIG. 1A depicts two example tasks 127A, 127B assigned to the helix chains 102. In this example, the task 127A is a relatively simple task assigned completely to the second helix chain 102B, while the task 127B is more complex and is divided up with a larger portion being assigned to the first helix chain 102A and a smaller portion being assigned to the second helix chain 102B. Such an assignment and division of tasks may balance load distribution, e.g., the task 127A and smaller portion of the task 127B assigned to the second helix chain 102B may be approximately equal to the larger portion of the task 127B assigned to the first helix chain 102A in this example.

The task scheduler 110 may manage the distribution of quantum computing tasks across the helix chains 102A, 102B, which may optimize the processing power of the system 100 in some embodiments. The task scheduler 110 may also monitor frequency, phase, and/or amplitude variations across the helix chains 102A, 102B to ensure synchronized operation. Alternatively or additionally, the task scheduler 110 may perform load balancing across the first and second helix chains 102A, 102B.

The system 100 may monitor, e.g., constantly or continuously, the modulated dimensions of frequency, phase, and amplitude of the helix chains 102A, 102B. For example, the sensors 114 may monitor the modulated dimensions of each of the first and second helix chains 102A, 102B. If one modulated dimension experiences an error (e.g., a phase drift), the system 100 may detect it through real-time monitoring, e.g., by the sensors 114, and correct it using the unaffected dimensions, e.g., using the error correction module 106, to restore an intended quantum state and/or maintain quantum state coherence.

One or more specific quantum error correction algorithms may be implemented, e.g., in or by the error correction module 106, to utilize redundancy provided by multidimensional modulation. For instance, if an error occurs in frequency modulation, the phase and/or amplitude may be adjusted to compensate for the error.

As an example, in the case of quantum error correction, the system 100 may utilize the multiple dimensions (frequency, phase, amplitude) to detect and correct errors. For instance, if one helix chain 102A, 102B exhibits a frequency deviation due to noise, the sensors 114 and/or the error correction module 106 may detects this through phase shifts or amplitude reductions. The system 100, using the error correction module 106, may dynamically adjust the amplitude or phase of an adjacent helix chain 102A, 102B to restore the quantum state and maintain coherence. Such error correction may ensure that errors from external noise or environmental fluctuations do not propagate through the system 100.

The performance of a quantum computing system that includes a double-helix structure, such as the double-helix structure 102, may be significantly better than in traditional binary quantum computing systems. For example, in a large-scale quantum computing task involving factorization, the double-helix system may process significantly more data in parallel compared to traditional binary quantum computing. Simulations by the instant inventors have shown that the double-helix system's parallel processing efficiency is up to 32 times higher than standard quantum bit operations due to multidimensional modulation and the use of multiple helix chains assuming idealized photon control and minimal decoherence. Further simulations have shown that the double-helix system detects phase drifts and corrects them with a success rate of over 98%, demonstrating the robustness of the error correction mechanism.

In an example implementation, the classical computing interface 122 of FIG. 1A may be configured to receive classical data input. The classical computing interface 122 may be configured to convert the classical data input into quantum information suitable for processing by the double-helix structure 102 and/or any of the QPUs 116. The classical computing interface 122 may be configured to transmit the quantum information to the controller 104 for modulation and processing in the first and second helix chains 102A, 102B. The classical computing interface 122 may be configured to convert quantum computation results from the double-helix structure 102 back into classical data output.

The double-helix quantum encoding architecture embodied in the system 100 of FIG. 1 may serve as a foundation for transmitting, receiving, and decoding quantum-encoded photons. The system 100 may support encoding and transmission functionalities as well as quantum processing and memory/storage integration.

Figure 1B:
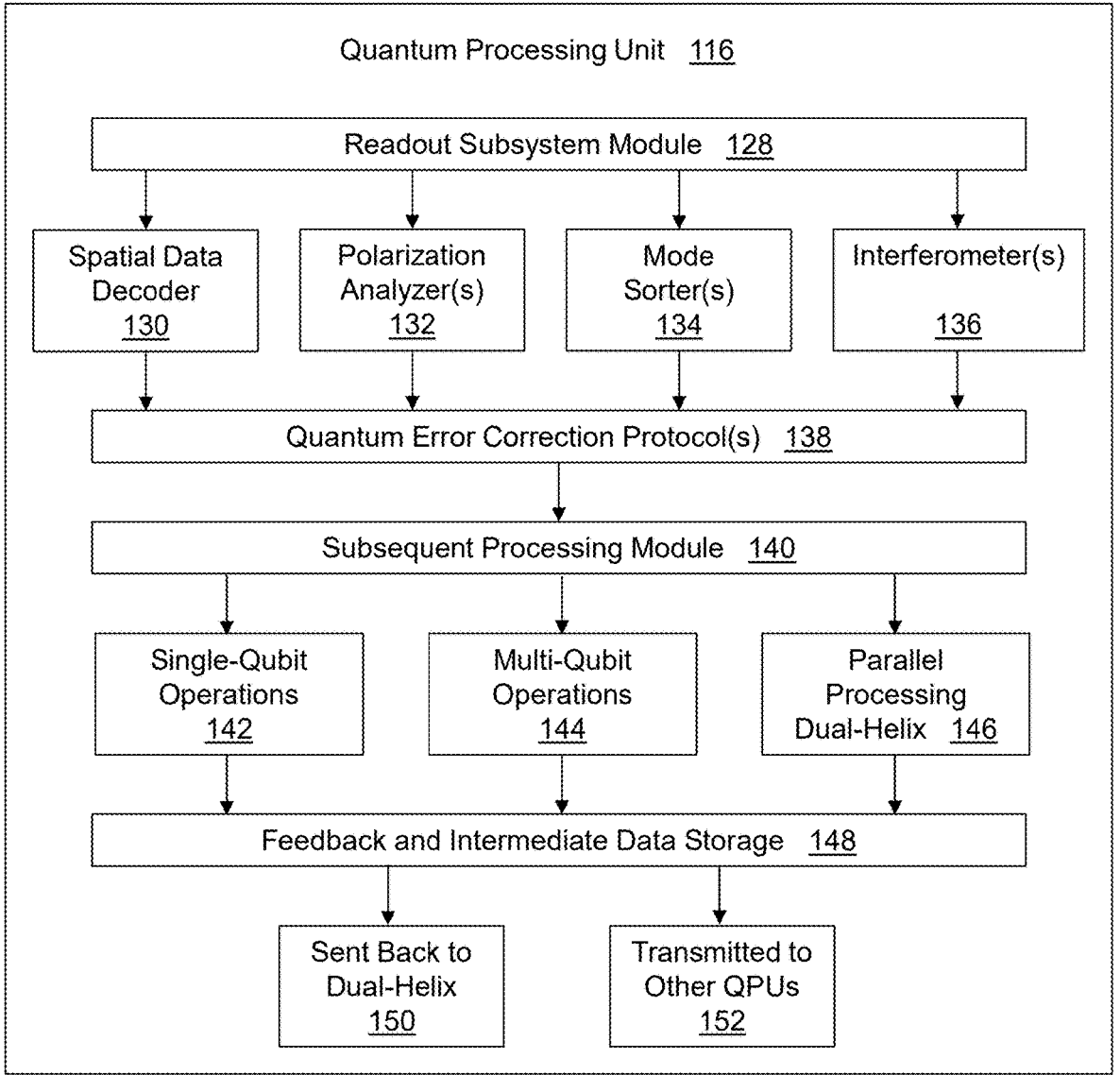
FIG. 1B illustrates an example implementation of a quantum processing unit (QPU) included in the quantum computing system of FIG. 1A.

The system 100 may include or support quantum gates and circuits for performing operations on qubits stored within the helix chains 102A, 102B, examples of which are described with respect to FIG. 1B and which may be incorporated into the double-helix structure 102. Processing may occur at designated quantum nodes along each helix chain 102A, 102B, where modulation of frequency, phase, and amplitude, e.g., using the controller 104, may enable operations such as quantum logic gates (e.g., CNOT, Hadamard).

The parallel nature of the helix chains 102A, 102B may allow for concurrent quantum computations. The task scheduler 110 may dynamically assign tasks across the helix chains 102A, 102B to optimize, or at least improve, computational throughput. As an example, for tasks like factorization, the double-helix structure 102 may process intermediate results in parallel, leveraging multidimensional quantum encoding for higher efficiency.

Nodes within the double-helix structure 102 may act as quantum memory units, storing quantum states encoded via frequency, phase, and amplitude modulation.

Multidimensional modulation, e.g., as provided by the controller 104, may provide inherent redundancy for error correction, ensuring the stability of stored quantum information against decoherence or environmental noise.

The use of multiple helix chains 102A, 102B in the double-helix structure 102 may increase storage density, allowing the system 100 to handle larger quantum datasets and intermediate results.

The double-helix quantum encoding architecture depicted in FIG. 1A may be combined with conventional computing systems to create a hybrid quantum-classical system. For example, the classical computing interface 122 may receive classical data inputs and convert them into quantum-encoded information for processing and transmit quantum computation results back as classical data outputs. Quantum-classical hybridization may allow classical processors (e.g., CPUs, GPUs) to manage scheduling, optimization, and error correction tasks and/or to handle preprocessing/post-processing of quantum states for tasks such as quantum machine learning or variational algorithms. Such hybrid systems may leverage the advantages of both classical and quantum computing, enabling more efficient cryptographic, optimization, and AI-driven computations.

Some example hybrid quantum-classical computing use cases include data preprocessing, postprocessing, and optimization problems. For instance, classical systems may: preprocess classical data before encoding it into quantum states, improving initial conditions for quantum computations; and postprocess quantum results after measurement, refining output data and reducing noise. Alternatively or additionally, classical systems may operate iteratively alongside quantum processors for: quantum machine learning (e.g., optimizing quantum neural networks, parameter tuning for variational circuits); and variational quantum algorithms (VQAs) where a classical optimizer refines quantum circuit parameters.

Hybrid approaches as described herein may leverage the strengths of both computing paradigms: quantum components may handle high-dimensional parallel computations (e.g., superposition, entanglement); and classical components may provide stability, control, and error mitigation, ensuring operational efficiency.

FIG. 1B illustrates an example implementation of the QPU 116 of FIG. 1A, arranged in accordance with at least one embodiment herein. As illustrated, the QPU 116 of FIG. 1B may include one or more of a readout subsystem module 128 (hereinafter "readout module 128"), a spatial data decoder 130, one or more polarization analyzers 132, one or more mode sorters 134, one or more interferometers 136, one or more quantum error correction protocols 138, a subsequent processing module 140, one or more single-qubit operations 142, one or more multi-qubit operations 144, a parallel processing double-helix 146, and a feedback and intermediate data storage 148. The single-qubit operations 142 may include, for example, a Hadamard gate or other suitable single-qubit operations. The multi-qubit operations 144 may include, for example, a controlled NOT gate (C-NOT), a Toffoli gate (or controlled-CNOT or CCNOT gate or SAWP gate), or other suitable multi-qubit operations. The parallel processing double-helix 146 may be a subset or functional implementation of the double-helix structure 102 in FIG. 1A. The parallel processing double-helix 146 may be optimized for use within a single QPU 116 (whereas the double-helix structure 102 may operate at the system level). The double-helix structure 102 may be a core component of the overall system 100 and may be integrated into one or more QPUs (116). However, the double-helix structure 102 may have broader functionality beyond a single QPU, supporting multiple QPUs and system wide parallel operations. Individual QPUs (116) may contain or include a localized implementation of a double-helix structure, referred to as the parallel processing double-helix 146 herein. The feedback and intermediate data storage 148 may output data that may be, e.g., sent back to the double-helix structure 102 of FIG. 1A at block 150 and/or transmitted to one or more other QPUs at block 152.

FIG. 1C illustrates an example implementation of the controller 104 of FIG. 1A, arranged in accordance with at least one embodiment herein. The controller 104 may modulate the frequency, phase, and/or amplitude of photons traveling within each helix chain 102A, 102B in real-time. The controller 104 may ensure that each helix chain 102A, 102B operates at an optimal modulation level to prevent overlap or signal degradation.

As illustrated, the controller 104 of FIG. 1C may include a phase modulator 154, a frequency modulator 156, and/or an amplitude modulator 158. In general, each of the phase modulator 154, the frequency modulator 156, and the amplitude modulator 158 may be configured to modulate, respectively, the phase, the frequency, and the amplitude of the double-helix structure 102 of FIG. 1A. The controller 104 modulating the phase, frequency, and/or amplitude of the double-helix structure 102 may include the controller 104 modulating the properties of individual photons that are processed at the various nodes of the double-helix structure 102, rather than modifying structural properties of the double-helix structure 102 itself. In particular, the controller 104 may modulate the phase, frequency, and amplitude of individual photons or qubits as they are processed within the double-helix structure 102. The double-helix structure 102 may remain a stable architectural framework, within which individual quantum states may be controlled dynamically.

In this and other embodiments, the double-helix structure 102 may be designed to maximize the information processing capacity of each qubit by incorporating multiple dimensions of modulation, e.g., frequency, phase, and amplitude, within the double-helix structure 102. Each helix chain 102A, 102B may store quantum information.

For example, each helix chain 102A, 102B may operate at a modulated frequency range (e.g., 1 GHz to 10 GHz), representing quantum states like $|0\rangle$ and $|1\rangle$. Different frequencies may correspond to different base quantum states. The frequency modulator 156 may modulate the frequency of photons within the helix chains 102A, 102B.

Alternatively or additionally, a frequency monitoring and control system may be implemented by the frequency modulator 156, together with one or more sensors 114 and/or the error correction module 106. The frequency monitoring and control system may ensure that frequency modulation across the helix chains 102A, 102B remains within a predetermined range. When frequency deviations occur (e.g., as detected by one or more of the sensors 114), the frequency monitoring and control system (the error correction module 106 and/or the frequency modulator 156) may adjust the frequency of one or both of the helix chains 102A, 102B to realign quantum states. The frequency monitoring and control system may monitor frequency modulation across the helix chains 102A, 102B, e.g., using a corresponding frequency sensor or monitor within the sensors 114, detect frequency deviations in the first helix chain or the second helix chain 102A, 102B, e.g., using the error correction module 106, and/or adjust a frequency of one or both of the helix chains 102A, 102B to realign quantum states in the helix chains 102A, 102B, e.g., using the frequency modulator 156 of the controller 104.

Phase modulation, as implemented by the phase modulator 154, may be used to create quantum superposition within the double-helix structure 102. Each phase shift in the double-helix structure 102 may represent changes in the quantum state, allowing the encoding of superposed states like $(|0\rangle + |1\rangle)/\sqrt{2}$ and/or others. The phase modulator 154 may control phase across the entire system 100 (by modulating phase of photons or qubits within the double-helix structure 102), ensuring synchronization.

Alternatively or additionally, a phase coupling mechanism may be implemented using the phase modulator 154, together with one or more sensors 114, and/or the error correction module 106. The phase coupling mechanism may ensure phase synchronization between the helix chains 102A, 102B to reduce computational errors caused by phase misalignment. The phase coupling mechanism may detect phase drifts (e.g., using a phase sensor of the sensors 114) and correct misalignment by adjusting the phase of the affected helix chain 102A, 102B via the error correction module 106 and/or the phase modulator 154 of the controller 104. The phase synchronization across the helix chains 102A, 102B may minimize, or at least reduce, computational errors due to, e.g., phase misalignment between the helix chains 102A, 102B.

Amplitude modulation, as implemented by the amplitude modulator 158, may increase the capacity of the system 100 for error correction. By dynamically adjusting the amplitude, the system 100 may counteract errors that arise from environmental disturbances or decoherence. The amplitude modulator 158 may control amplitude across the entire system 100 (by modulating amplitude of photons or qubits within the double-helix structure 102).

FIG. 1D illustrates an example implementation of the photon system 112 of FIG. 1A, arranged in accordance with at least one embodiment herein. As illustrated, the photon system 112 of FIG. 1D may include a photon generation and control system 160, a quantum photon emitter 162, a phase modulator 164, an orbital angular moment (OAM) modulator 166, and/or a polarization modulator 168. In general, each of the phase modulator 164, the OAM modulator 166, and the polarization modulator 168 may be configured to modulate, respectively, the phase, the OAM, and the polarization of photons that the photon system 112 provides to the double-helix structure 102 of FIG. 1A.

In some embodiments, the system 100 with its various components as depicted in FIGS. 1A-1D, may operate generally as follows. Referring to FIGS. 1A and 1C, the controller 104 may modulate properties of each of the first and second helix chains 102A, 102B of the double-helix structure 102 of FIG. 1A. For example, the phase modulator 154 (FIG. 1C) of the controller 104 may modulate the phase of each of the first and second helix chains 102A, 102B. The frequency modulator 156 (FIG. 1C) of the controller 104 may modulate the frequency of photons traveling within each of the first and second helix chains 102A, 102B. The amplitude modulator 158 (FIG. 1C) of the controller 104 may modulate the amplitude of each of the first and second helix chains 102A, 102B.

Referring to FIGS. 1A and 1D, the photon system 112 may generally generate single photons and provide them to the double-helix structure 102. In more detail, the photon generation and control system 160 may generate photons which may be emitted by the quantum photon emitter 162. Quantum information (e.g., input data for a computation) may be encoded into each photon by modulating one or more of each photon's phase, OAM, and/or polarization, e.g., using the phase modulator 164, the OAM modulator 166, and/or the polarization modulator 168. The phase modulator 164, the OAM modulator 166, and the polarization modulator 168 are depicted as being part of the photon system 112 that is external to the double-helix structure 102. In other embodiments, the phase modulator 164, the OAM modulator 166, and/or the polarization modulator 168 may be integrated into the double-helix structure 102, e.g., to modulate photon properties during computation rather than beforehand.

The OAM modulator 166 may encode high-dimensional information by modulating the OAM of each photon. For example, a photon may be assigned OAM values of +1, −1, or higher-order modes. These states may correspond to distinct quantum information channels, increasing encoding capacity.

The polarization modulator 168 may encode binary quantum states by modulating photon polarization. For example, horizontal or vertical polarization may represent binary quantum states $|0\rangle$ or $|1\rangle$. Circular polarization states (left or right) may be used for alternative qubit encoding schemes (e.g., polarization-entangled qubits).

The phase modulator 164 may add extra encoding layers for complex state representation. For example, photons may be modulated to include arbitrary phase values, which may enhance the encoding of multi-qubit states. Alternatively or additionally, this may enable interference-based quantum computing and multi-photon entanglement schemes. Whereas the phase modulator 154 of FIG. 1C may control phase across the entire system, the phase modulator 164 of FIG. 1D may operate within a QPU 116, handling localized phase corrections for specific quantum gate operations.

The waveguides and dynamic couplers 124 are depicted in FIG. 1A as being external to the double-helix structure 102. In other embodiments, one or more of the waveguides and/or dynamic couplers 124 may be integrated directly into and/or embedded within the double-helix structure 102, facilitating internal routing of encoded photons between processing nodes. Encoded photons (e.g., modulated in phase, OAM, and/or polarization) may be routed through free-space and/or waveguides embedded in the double-helix structure 102. Dynamic couples may selectively direct encoded photons to an appropriate processing unit (e.g., any of the QPUs 116). The waveguides and dynamic couplers may include or be included in the waveguides and dynamic couplers 124 of FIG. 1A, for instance. The waveguides and dynamic couplers (whether external to and/or integrated within the double-helix structure 102) may ensure efficient quantum state transfer between subsystems.

Referring to FIGS. 1A-1B, each QPU 116 includes a subsystem, such as the readout subsystem module 128, to detect and decode photons. The readout subsystem module 128 may include the spatial data decoder 130, the polarization analyzer 132, the mode sorter 134, and/or the interferometer 136. The readout subsystem module 128 may detect the incoming photons (received from the double-helix structure 102 via the waveguides and dynamic couplers 124) and extract quantum states using, e.g., the polarization analyzer 132 to detect polarization of each photon, the mode sorter 134 to detect OAM of each photon, and/or the interferometer 136 to detect the phase of each photon. The extracted quantum states may be mapped to qubits in the QPU 116 for subsequent processing. Alternatively or additionally, classical information (e.g., bits) or other information may be encoded in the spatial location of each photon at the double-helix structure 102 which may be extracted by the spatial data decoder 130 when the photons are received at the QPU 116, additional details of which are described below.

The quantum error correction protocols 138 may be applied to ensure data integrity during transmission and decoding. The quantum error correction protocols 138 may include surface codes, Shor codes, or other suitable quantum error detection and/or correction protocols. The quantum error correction protocols 138 may be part of and/or implemented by the error correction module 106 of FIG. 1A. The quantum error correction protocols 138 may be an internal component or implementation of the broader error correction module 106. The QPU 116 may execute the quantum error correction protocols 138 as part of its quantum processing. Higher level error correction functionality (e.g., system wide monitoring, real time adjustments, and redundancy-based corrections) may be managed by error correction module 106. The error correction module 106 may oversee the entire double-helix structure 102, whereas the quantum error correction protocols 138 may focus more specifically on correcting individual qubit errors within the QPU 116. Thus, in some embodiments, the error correction module 106 in FIG. 1A encompasses the quantum error correction protocols 138 in FIG. 1B, integrating them into the system 100.

The subsequent processing module 140 may include the single-qubit operations 142, the multi-qubit operations 144, and/or the parallel processing double-helix 146. The QPU 116 may perform single-qubit gate operations 142 (e.g., X, Z, Hadamard gates) to manipulate individual qubits based on a given computation task. For example, a Hadamard gate may be implemented in the single-qubit operations 142 by the subsequent processing module 140 to create a superposition state from an input state. The QPU 116 may perform multi-qubit gate operations 144 to, e.g., entangle qubits or perform conditional operations. For example, a CNOT gate may be implemented in the multi-qubit operations 144 by the subsequent processing module 140 to flip a target qubit's state based on a control qubit's state. The QPU 116 may leverage the parallel nature of the parallel processing double-helix 146 (which may have a same or similar configuration as the double-helix structure 102 of FIG. 1A) to perform operations on multiple qubits simultaneously, distributed across helix chains. The QPU 116 may also execute multi-qubit gate operations 144, such as CNOT gates, Toffoli gates, and/or other gates. CNOT gates flip a target qubit's state based on a control qubit's state. Toffoli gates (and/or CCNOT gates) may be implemented for complex multi-qubit conditional logic. Alternatively or additionally, the QPU 116 may leverage the parallel processing double-helix 146 (which may have a similar or identical configuration to the double-helix structure 102 of FIG. 1A) to perform simultaneous quantum operations distributed across multiple qubits and helix chains.

Processed quantum states generated by the subsequent processing module via the single-qubit operations 142, the multi-qubit operations 144, and/or the parallel processing double-helix 146 may be sent back to the double-helix structure 102 of FIG. 1A for storage or further routing, as indicated at block 150, and/or transmitted to other QPUs 116 for additional computation, as indicated at block 152. Quantum memory modules, such as the memory module 118 of FIG. 1A, may store intermediate results or checkpointed states for multi-step computations.

Referring to FIG. 1A, the central control module 108 may coordinate data flow between the double-helix structure 102 and the QPUs 116, and may ensure that operations are synchronized. The central control module 108 may dynamically allocate QPU resources based on task priority and node availability. The real-time feedback loops 120 may monitor photon fidelity, gate execution, and/or routing efficiency. Adjustments may be made dynamically, e.g., as part of the real-time feedback loops 120, to minimize losses and optimize performance.

An example use case of the system 100 of FIG. 1A may involve solving a combinatorial optimization problem using the Variational Quantum Eigensolver (VQE) and may involve encoding, processing, iteration, and output. For encoding, input problem parameters may be encoded into photons within the double-helix structure, e.g., using the photon system 112 (or more specifically the phase modulator 164, the OAM modulator 166, and the polarization modulator 168 of FIG. 1D). For processing, the QPU 116 may execute quantum circuits (e.g., in the subsequent processing module 140 of FIG. 1B) to compute energy states. Intermediate results may be routed back to the double-helix structure 102 for temporary storage. For iteration, a classical computing system, which may be accessed via the classical computing interface 122 of FIG. 1A, may optimize parameters based on quantum results to update the encoding for subsequent iterations. For output, an optimized solution may be extracted after several iterations.

Integration of the double-helix structure 102 in or with any of the QPUs 116 may include one or more of the following advantages. First, multiple quantum operations may be executed simultaneously across distributed nodes in the double-helix structure 102. Second, multi-dimensional quantum states may enable compact and efficient data representation. Third, the modular nature of the double-helix architecture may support the addition of more nodes and QPUs 116 as computational demands grow. Fourth, redundant encoding and real-time error correction may ensure robust operations in noisy quantum environments.

Quantum superposition is a fundamental principle of quantum mechanics that allows quantum systems to exist in multiple states simultaneously. In the context of quantum computing, superposition enables qubits to represent both 0 and 1 states at the same time, in contrast to classical bits which can only be in one state at a time. This property may allow quantum computers to perform certain calculations exponentially faster than classical computers for specific problems.

In the system 100 of FIG. 1A, superposition may be implemented and controlled through phase modulation of quantum states encoded in the double-helix structure 102. The phase modulation may allow for the creation and manipulation of superposed states within each helix chain 102A, 102B. For example, a qubit in superposition may be represented as $(|0\rangle + |1\rangle)/\sqrt{2}$, where $|0\rangle$ and $|1\rangle$ are the basis states.

The system 100 of FIG. 1A may leverage superposition in one or more of the following ways:

Phase modulation (e.g., by the phase modulator 154) may be used to create and control superposed states within each helix chain 102A, 102B. By adjusting the phase, the system 100 may generate various superposition states.

The parallel nature of the double-helix structure 102 may allow for simultaneous superposition of multiple qubits across different helix chains 102A, 102B, potentially enabling more complex quantum operations.

The error correction module 106 may utilize superposition to detect and correct errors. By creating superposed states that are sensitive to specific types of errors, the system may more efficiently identify and mitigate quantum noise and decoherence.

Superposition may be employed in the QPUs 116 to perform quantum logic operations on the encoded states. These operations may include creating superpositions, entangling qubits, and implementing quantum gates.

Quantum memory modules, such as the memory modules 118, may store superposed states, allowing for the preservation of quantum information between processing steps.

By incorporating superposition into various aspects of the system 100, the system 100 may achieve enhanced computational power and flexibility compared to classical systems. This may enable more efficient solutions to complex problems in fields such as cryptography, optimization, and quantum simulation.

The double-helix quantum encoding architecture of the system 100 of FIG. 1A may deliver performance improvements for quantum computing systems in one or more of enhanced information storage and processing capacity, increased parallel processing capability, and/or improved error tolerance and correction. Regarding information storage and processing capacity, by utilizing multidimensional modulation, the system 100 may process more information within the same storage space, increasing information density by up to 32 times or more assuming idealized photon control and minimal decoherence. Regarding parallel processing capability, the parallel design of the helix chains 102A, 102A allows the system 100 to handle numerous complex tasks simultaneously, significantly improving computation speed. Regarding error tolerance and correction, the multidimensional modulation and coupling mechanism of the system 100 provides an efficient error correction system, minimizing errors caused by decoherence and improving computational accuracy and stability.

FIG. 2 depicts a flowchart 200 of a method for quantum computing, arranged in accordance with at least one embodiment described herein. The method 200 may be programmably performed or controlled by a processor in, e.g., a computer and/or server coupled to the classical computing interface 122. In an example implementation, the method 200 may be performed in whole or in part by the system 100 of FIG. 1A under the control of a classical processor (coupled to the classical computing interface 122). Some embodiments herein may include a non-transitory computer-readable storage medium that includes computer-executable instructions executable by a processor device to perform or control performance of any operations herein, such as the operations of the method 200 of FIG. 2. The method 200 may include one or more of blocks 202, 204, and/or 206.

At block 202, the method 200 may include modulating quantum information in a first helix chain and a second helix chain of a double-helix quantum encoding structure using frequency modulation, phase modulation, and amplitude modulation. For example, block 202 may include the controller 104, and specifically the phase modulator 154, frequency modulator 156, and/or amplitude modulator 158, modulating quantum information in the first helix chain 102A and the second helix chain 102B of the double-helix structure 102. Block 202 may be followed by block 204.

At block 204, the method 200 may include performing parallel quantum operations within the first helix chain and the second helix chain. For example, block 204 may include the double-helix structure performing parallel quantum operations within the first helix chain 102A and the second helix chain 102B as described with respect to the double-helix structure 102 of FIG. 1A and/or the parallel processing double-helix 146 of FIG. 1B. Block 204 may be followed by block 206.

At block 206, the method 200 may include implementing error correction within the first helix chain and the second helix chain using the frequency modulation, phase modulation, and amplitude modulation. For example, block 206 may include the error correction module 106, in whole or in part, implementing error correction within the first helix chain 102A and the second helix chain 102B.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

For example, the method 200 may further include detecting phase drift between the first helix chain and the second helix chain, e.g., by a phase sensor of the sensors 114. In response to detecting the phase drift, the method 200 may further include synchronizing phases across the first helix chain and the second helix chain. Synchronizing the phases may be performed by the error correction module 106 and/or the controller 104 (or specifically the phase modulator 154). In some embodiments, synchronizing phases across the first helix chain and the second helix chain may reduce computational errors due to phase misalignment between the first helix chain and the second helix chain.

As another example, the method 200 may further include monitoring frequency modulation across the first helix chain and the second helix chain to detect frequency deviations in the first helix chain or the second helix chain. In response to detecting a frequency deviation, the method 200 may further include adjusting frequency of one or both of the first helix chain or the second helix chain to realign quantum states in the first helix chain and the second helix chain.

As another example, the method 200 may further include distributing quantum computing tasks across the first helix chain and the second helix chain. The method 200 may further include performing load balancing across the first helix chain and the second helix chain.

As another example, the method 200 may further include detecting errors in at least one of frequency modulation, phase modulation, or amplitude modulation in the first helix chain or the second helix chain. In response to detecting the errors, the method 200 may further include correcting detected errors using unaffected modulation dimensions to maintain quantum state coherence.

As another example, modulating quantum information at block 202 may include modulating frequency, phase, and amplitude of each of the first helix chain and the second helix chain in real-time. Alternatively or additionally, modulating quantum information at block 202 may include preventing overlap or signal degradation between the first helix chain and the second helix chain.

In some embodiments, the frequency modulation may represent basic quantum states. The phase modulation may control quantum superposition. The amplitude modulation may enhance error correction capabilities.

Alternatively or additionally, the method 200 may further include encoding quantum bits in the double-helix quantum encoding structure using the frequency modulation, phase modulation, and amplitude modulation. Alternatively or additionally, the method 200 may further include processing multiple quantum states simultaneously using the frequency modulation, phase modulation, and amplitude modulation.

FIG. 3 illustrates an example quantum communication system 300 (hereinafter "system 300") that may be implemented for secure quantum communication, arranged in accordance with at least one embodiment described herein. The system 300 may include a quantum computing system, such as the system 100 and/or double-helix structure 102 of FIG. 1A and a receiver 304.

For example, as illustrated, the system 300 includes a double-helix structure 302 that may include, be included in, or correspond to the double-helix structure 102 of FIG. 1A.

The double-helix structure 302 includes both a first helix chain 302A and a second helix chain 302B. The double-helix structure 302 may have a same or similar configuration as the double-helix structure 102. Further, the double-helix structure 302 includes multiple emission points 306A, 306B, 306C (hereinafter collectively "emission points 306" or generically "emission point 306"), only some of which are labeled in FIG. 3 for simplicity.

As illustrated, each of the helix chains 302A, 302B includes multiple emission points 306 distributed along the helix chain 302A, 302B, the emission points 306 acting as classical information encoding points. The spacing between emission points 306 may be consistent from one emission point 306 to the next or it may be variable. Alternatively or additionally, the density of emission points 306 along any given complete turn of each helix chain 302A, 302B may be, e.g., 2, 3, 4, 5, 8, 13, 16 or more or fewer emission points 306 per turn.

The emission points 306 may encode classical information as follows. Classical information may be assigned to each emission point 306. At the double-helix structure 302, classical information may be encoded in photons by emitting the photons from emission points that have desired classical information to be encoded. At the receiver 304, the emission point 302 (or specifically its spatial coordinate) of each photon may be detected to decode the classical information encoded in the photon's emission point 306.

The specific classical information assigned to the emission points 306 may depend on a given communication protocol. In some embodiments, each emission point 306 may be assigned unique classical information. For example, (1) classical bit value 00 may be assigned to emission point 306A, (2) classical bit value 01 may be assigned to emission point 306B, (3) classical bit value 10 may be assigned to emission point 306C, and (4) classical bit value 11 may be assigned to a next emission point 306 following emission point 306C, with potentially other unique classical bit values assigned to the other emission points 306. In some embodiments, the emission points 306 may be assigned redundant classical information, such as assigning (1) classical bit value 0 to two or more of the emission points 306 (e.g., 306A and 306C) and (2) classical bit value 1 to two or more others of the emission points 306 (e.g., 306B and the next emission point 306 following 306C), with potentially other redundant classical information being assigned to two or more others of the emission points 306.

Quantum information may be encoded in each photon before the photons are provided to the double-helix structure 302 and/or within the double-helix structure 302. In some embodiments, the quantum information is encoded in the photons using a photon system, such as the photon system 112 of FIGS. 1A and 1D, that includes, e.g., a polarization modulator (such as the polarization modulator 168), an OAM modulator (such as the OAM modulator 166), and/or a phase modulator (such as the phase modulator 164). In some embodiments, for each photon, the OAM state may encode a first set of one or more quantum bits, the polarization state may encode a second set of one or more quantum bits, and the phase state may encode a third set of one or more quantum bits. Thus, a composite quantum state made up of the OAM state, the polarization state, and the phase state may encode more quantum information than any one of the OAM state, polarization state, or phase state individually.

Accordingly, in some embodiments, the double-helix structure 302 may be utilized to combine classical and quantum information into a composite encoding scheme.

Each emission point 306 on the double-helix structure 302 may be associated in some embodiments with a specific classical information bit, while the composite quantum state of the photon (OAM, polarization, and phase) may represent the quantum information. The overall composite state (position+composite quantum state) may allow the system 300 to carry more information per photon than traditional quantum communication methods.

The receiver 304 may include any suitable components to decode the classical and/or quantum information carried by each photon. For example, the receiver 304 may include one or more of the same or similar components as the QPU 116 of FIGS. 1A-1B, including, e.g., the readout subsystem module 128, the spatial data decoder 130 (to detect the emission point 306 of each photon and thereby decode the photon's classical information), the polarization analyzer 132 (to detect the photon's polarization state), the mode sorter 134 (to detect the photon's OAM state), and/or the interferometer 136 (to detect the photon's phase state), and/or other components of the QPU 116.

The proposed communication protocol may integrate with QKD systems, such as the BB84 or E91 protocols, to generate secure encryption keys. The quantum states of the photons transmitted through the double-helix structure 302 may be used to establish a secure key between communication parties. By using randomization of each photon's quantum state (e.g., polarization basis) and its spatial emission coordinate along the double-helix structure 302, the system 300 may enhance the security of the key distribution process.

In more detail, a QKD protocol may be implemented through the system 300 to establish secure cryptographic keys between two parties. The QKD protocol may utilize the unique properties of the double-helix structure 302 and the quantum states of photons to ensure the security of the distributed keys.

In one implementation, the system 300 may employ a BB84 protocol adapted for the double-helix structure 302. The sender (that includes the double-helix structure 302) may randomly select emission points 306 along the double-helix structure 302 and encode qubits using one of two mutually unbiased quantum bases. This spatial entropy adds an orthogonal layer of unpredictability on top of quantum basis randomness. For each bit of the key, the sender may randomly choose between two conjugate bases, such as the rectilinear basis (horizontal and vertical polarization states) and the diagonal basis (45° and 135° polarization states). The choice of emission point 302 may add an additional layer of randomization to the protocol.

The receiver 304 may independently and randomly choose which basis to measure each received photon, without knowing which basis the sender used to encode it. After the quantum transmission, the sender and receiver may communicate over a classical authenticated channel to compare the bases they used. They may discard all instances where the receiver 304 measured in a different basis than the sender used for encoding. The remaining bits may form the raw key.

The spatial coordinates of the emission points 306 may be used as an additional verification mechanism. The sender may disclose the mapping between emission points 306 and bit values for a subset of the transmitted bits. If an eavesdropper had attempted to intercept the transmission, the spatial pattern would be disrupted, yielding anomalous or inconsistent coordinate-bit mappings upon public verification, which may indicate eavesdropping. This may provide another means to detect the intrusion.

The system 300 may implement decoy state QKD to address potential vulnerabilities related to photon number splitting attacks. By randomly varying the intensity of the photon pulses between signal states and decoy states, the legitimate users may detect the presence of an eavesdropper who might be attempting to exploit multi-photon emissions.

Post-processing steps may be applied to the raw key to ensure its security and reliability. Error correction may be performed to reconcile any discrepancies between the sender's and receiver's versions of the key. Privacy amplification techniques may then be applied to reduce any potential information leakage to an eavesdropper to a negligible level.

The double-helix structure 302 may enable a high-dimensional QKD protocol by utilizing the OAM states of photons in addition to polarization states. This approach may increase the effective per-photon entropy and support higher-dimensional QKD schemes, thereby allowing more key bits per transmitted photon.

The system may implement continuous-variable QKD (CV-QKD) techniques by encoding information in the quadrature components of the electromagnetic field. This approach may provide resistance to certain types of attacks that target discrete-variable quantum systems, such as intercept-resend or photon-number-splitting attacks.

Authentication mechanisms may be incorporated into the QKD protocol to verify the identity of the communicating parties. Quantum authentication protocols may be combined with classical authentication methods to ensure that only authorized users can access the quantum communication channel.

The system 300 may be integrated with existing cryptographic infrastructure to provide quantum-enhanced security for conventional encryption schemes. The quantum-distributed keys may be used as session keys for symmetric ciphers (e.g., AES-256), key-wrapping, or as entropy seeds in secure key derivation functions.

The system 300 may implement a key management protocol to handle the storage, distribution, and refreshment of quantum-distributed keys. Regular key rotation may be performed to maintain forward secrecy, ensuring that the compromise of one key does not affect the security of past or future communications.

Multiple QKD links based on the double-helix structure 302 may be combined to form a quantum key distribution network. Such a network may enable secure communication between multiple parties across extended distances through the use of trusted nodes, quantum repeaters, or entanglement swapping nodes, depending on physical implementation constraints.

The system 300 may incorporate countermeasures against side-channel attacks that target the physical implementation rather than the protocol itself. These countermeasures may include isolation of critical components, randomization of timing patterns, and monitoring of power consumption and electromagnetic emissions.

The system may implement measurement-device-independent QKD (MDI-QKD) to eliminate vulnerabilities in the detection apparatus. In this approach, neither the sender nor the receiver performs the measurements that generate the secure key, thereby removing a significant attack vector from the system. The system 100 and/or 300 and/or distinct instances thereof may be included in the sender and/or the receiver. In such configurations, the sender and receiver may each include an emission module as described herein (e.g., a double-helix structure or other structure), and the untrusted relay node may perform Bell-state measurements using interferometers, beam splitters, and coincidence detectors.

The measurement results may be publicly broadcast, and the sender and receiver may distill a shared key by post-selecting events based on matching basis choices. The system architecture described herein supports such MDI-QKD implementations through precise emission point control and synchronized photon state modulation. Alternatively or additionally, In MDI-QKD, both sender and receiver may prepare quantum states (often weak coherent pulses) and transmit them to an untrusted third-party measurement node. The untrusted third-party measurement node performs a Bell-state measurement, and the correlation results are used to distill a key between sender and receiver without either endpoint performing quantum measurements. In some embodiments herein, spatial emission point selection may be used to encode classical control data (e.g., basis selection or time-bin identity), while quantum state modulation aligns with the encoded basis. Embodiments of the emission structure herein (e.g., double-helix structure 102, 302) could serve as the physical front-end for such MDI-QKD transmissions enabling controlled, synchronized emission of spatially distinguishable, quantum-encoded pulses toward the untrusted third-party measurement node.

Device-independent QKD (DI-QKD) protocols may be compatible with implementations of the double-helix structure 302 in systems that support entangled photon generation and nonlocal measurement. These protocols may provide security guarantees that are independent of the internal workings or trustworthiness of the quantum devices themselves. In such embodiments, the system 300 may be configured to enable entanglement-based transmission between emission points and detectors, and to support statistical verification of Bell inequality violations if entanglement sources and detector isolation permit CHSH (Clauser-Horne-Shimony-Holt) inequality violations under practical constraints. This allows legitimate users to confirm the presence of quantum correlations and detect any eavesdropping or device tampering without relying on assumptions about detector or source behavior.

As an example of one specific QKD protocol, the BB84 protocol may be implemented within the system 300 to provide a robust method for quantum key distribution. The BB84 protocol, named after its creators Charles Bennett and Gilles Brassard in 1984, may utilize quantum properties to establish a secure cryptographic key between two parties, conventionally referred to as Alice and Bob. The protocol may leverage the fundamental principles of quantum mechanics, particularly the no-cloning theorem and the uncertainty principle, to detect any eavesdropping attempts during key exchange.

In the context of the system 300, the BB84 protocol may be implemented as follows. The sender may randomly choose between two conjugate bases for encoding quantum bits. These bases may include the rectilinear basis (horizontal and vertical polarization states, denoted as $|0\rangle$ and $|1\rangle$) and the diagonal basis (45° and 135° polarization states, denoted as $|+\rangle$ and $|-\rangle$). The sender may randomly select one of these bases for each photon and then randomly encode either a 0 or 1 by setting the appropriate polarization state within the chosen basis.

The photons may then be emitted from specific emission points 306 along the double-helix structure 302, adding a spatial dimension to the quantum key distribution process. The receiver 304 may independently and randomly choose which basis to use for measuring each incoming photon. When the receiver 304 happens to choose the same basis that the sender used for a particular photon, the measurement may yield the correct bit value with high probability. However, when the receiver 304 chooses a different basis than the sender used, the measurement result may be uncorrelated with the bit the sender encoded.

After the quantum transmission phase, the sender and receiver 304 may communicate over a classical channel to compare the bases they used for each photon, without revealing the actual bit values. They may discard all instances where they used different bases, keeping only the bits where they happened to choose the same basis. This process, known as sifting, may result in a shared key that may be approximately half the length of the original sequence.

The security of the BB84 protocol when implemented with the double-helix structure 302 may be enhanced by the additional spatial encoding. Any eavesdropper attempting to intercept the photons may need to correctly identify not only the quantum state but also the precise emission point 306 on the double-helix structure 302, introducing exponential complexity for eavesdroppers attempting to reconstruct both quantum state and classical emission position simultaneously. The eavesdropper may inevitably introduce detectable errors due to the no-cloning theorem and the uncertainty principle.

To verify the security of the established key, the sender and receiver 304 may perform error estimation by publicly comparing a random subset of their sifted key bits. If the error rate exceeds a predetermined threshold, they may abort the protocol, suspecting eavesdropping. Otherwise, they may proceed with privacy amplification and error correction to derive the final secure key.

The implementation of the BB84 protocol within the system 300 may incorporate the following steps. First, a controller (e.g., the central control module 108 of FIG. 1A) may assign random bases and bit values for each photon to be transmitted using a cryptographically secure pseudorandom generator or entropy source, optionally seeded from a trusted setup phase. Second, a quantum state modulator (e.g., included in the photon system 112 of FIGS. 1A and 1D) may adjust the polarization states of the photons according to the chosen bases and bit values. Third, the controller may select random emission points 306 on the double-helix structure 302 for each encoded photon. Fourth, the photons may be emitted from the selected emission points.

At the receiving end (e.g., the receiver 304), a detector or detector array (e.g., the spatial data decoder 130 of FIG. 1B) may detect the spatial coordinates of the received photons, while the quantum state measurement system (e.g., components 132, 134, and/or 136 of FIG. 1B) may measure the polarization states using randomly chosen bases. The classical communication channel may then be used for basis reconciliation, error estimation, and the subsequent steps of the BB84 protocol. Accurate spatial decoding of emission points is non-trivial and depends on high-resolution photon detectors, time-of-flight calibration, and isolation from ambient noise. Errors in coordinate detection could lead to classical bit errors even when quantum state decoding is successful. Therefore, receiver 304 may include spatial filtering optics, timing synchronization systems, and signal discrimination algorithms to ensure reliable bit recovery from composite quantum-spatially encoded photons.

The integration of the BB84 protocol with the spatial encoding provided by the double-helix structure 302 may result in a quantum key distribution system with enhanced security and efficiency, enabling increased security, key throughput, and eavesdropping detectability by leveraging composite encoding dimensions. The multi-dimensional nature of the encoding may increase the information capacity per transmitted photon, potentially improving the key generation rate compared to traditional implementations of the BB84 protocol.

The double-helix structure 302 may offer inherent noise resistance and error correction capabilities through its geometric redundancy, meaning spatially distributed emission points provide fault tolerance through localized redundancy. In some embodiments, by encoding classical and quantum information redundantly across multiple emission points 306, the system 300 may detect and correct both bit-level and spatial transmission errors. Alternatively or additionally, classical error correction codes may be applied to the classical information encoded in the spatial coordinates of the emission points 306.

In more detail, error correction and noise resistance may be implemented in the system 300 to enhance the reliability and robustness of information transmission. The system 300 may employ one or more layers of error correction mechanisms to address both quantum and classical errors that could arise during transmission.

Quantum error correction techniques may be applied to protect the quantum states of photons transmitted through the double-helix structure 302. These techniques may include quantum error correction codes such as the Shor code, Steane code, or surface codes, depending on physical implementation constraints and system qubit count, which can detect and correct errors that affect the quantum states of individual photons. The quantum error correction may be implemented by encoding logical qubits across entangled physical qubits, enabling detection and correction of both bit-flip (X) and phase-flip (Z) errors.

For the classical information encoded in the spatial coordinates of emission points on the double-helix structure 302, conventional error correction codes such as Reed-Solomon, BCH (Bose-Chaudhuri-Hocquenghem), or LDPC (Low-Density Parity-Check) codes may be applied. These classical error correction techniques may help mitigate spatial detection errors and provide protection against errors in the detection of spatial coordinates, ensuring that the classical component of the composite encoding remains reliable.

The double-helix structure 302 itself may contribute to error resistance through its geometric properties. The helical arrangement of emission points may provide spatial diversity, analogous to spatial diversity in MIMO communication systems, allowing recovery from localized transmission disturbances. This spatial redundancy may enhance the resistance of the system 300 to localized disturbances or channel impairments that could affect specific regions of the transmission path.

Noise resistance may be further enhanced through the implementation of noise filtering techniques at both the transmitter and receiver 304 ends of the communication system. At the transmitter (that includes the double-helix structure 302), narrow-band filtering (e.g., via Bragg grating filters or etalons) may reduce spectral spread and mitigate chromatic dispersion. At the receiver 304, spatial filtering, spectral filtering, and temporal filtering may be combined to isolate the signal photons from ambient noise and interference.

Adaptive error correction strategies, such as rate-compatible LDPC decoding or dynamic syndrome matrix updates for quantum codes, based on monitored quantum bit error rate (QBER) and environmental conditions, may be employed to optimize the performance of the system 300 under varying channel conditions. The system 300 may continuously monitor the error rates and channel characteristics, adjusting the error correction parameters and encoding schemes to maintain reliable communication even in the presence of time-varying noise and interference.

For QKD applications, decoy-state protocols may help detect photon-number-splitting attacks. These security mechanisms may be complemented by error correction protocols to ensure robust and secure transmission.

The composite nature of the encoding scheme, combining spatial coordinates with multiple quantum states, may provide inherent resistance to certain types of errors and noise. Errors affecting one encoding dimension (e.g., OAM) may not necessarily impact other dimensions (e.g., polarization or spatial coordinates), thereby enabling error localization and partial recovery strategies. For instance, a disturbance affecting phase may still preserve spatial or polarization coherence, enabling fallback decoding.

In some embodiments, the combination of quantum states (OAM, polarization, phase) and randomization of emission points 302 may offer enhanced resistance to eavesdropping. Any attempt to intercept or measure the quantum states of the photons results in disturbance, which is detectable by the legitimate communication parties. Moreover, the spatial randomization of the emission points 302 may prevent potential attackers from predicting the transmission pattern, further securing the communication process.

In more detail, security and eavesdropping resistance may be enhanced through several mechanisms inherent to the system 300. The combination of spatial coordinates and quantum states may provide multiple layers of security that work together to detect and prevent unauthorized access to the transmitted information.

The system 300 may implement quantum non-cloning principles to ensure that any attempt to copy or measure the quantum states of photons during transmission may disturb those states in a detectable manner. Since quantum states cannot be perfectly copied according to the quantum no-cloning theorem, quantum states cannot be perfectly copied and any eavesdropping attempt may introduce measurable errors in the received quantum states. The legitimate users may detect these errors by comparing a subset of their transmitted and received bits over a classical authenticated channel.

Spatial coordinate randomization may add another layer of security to the communication protocol. By randomly selecting emission points 302 along the double-helix structure 302, the system 300 may create an unpredictable pattern that may be difficult for an eavesdropper to anticipate or intercept. This spatial randomization may effectively function as an additional obfuscation layer, complicating interception without knowledge of the spatial-to-bit mapping between emission points 306 and classical bit values.

The system 300 may implement decoy state protocols to further enhance security against potential photon-number-splitting attacks. By randomly varying the intensity of photon pulses between signal states and decoy states, the system 300 may allow legitimate users to estimate the quantum bit error rate and detect the presence of an eavesdropper who might be attempting to exploit multi-photon emissions.

Continuous variable quantum key distribution (CV-QKD) techniques may be optionally supported by modulating quadrature-phase amplitudes of coherent light fields in compatible implementations of the system 300. By encoding information in the quadrature components of the electromagnetic field, the system 300 may create another dimension of security that may be resistant to certain types of attacks that target discrete variable quantum systems.

The system 300 may implement authentication protocols to verify the identity of the communicating parties. Quantum authentication protocols, which may utilize quantum states to verify the identity of the sender and receiver, may be combined with classical authentication methods to ensure that only authorized users can access the quantum communication channel.

Forward secrecy may be maintained by regularly changing both the emission point mapping and quantum basis selection schemes may provide session-level forward secrecy and rotation-resistant keying. This approach may ensure that even if an eavesdropper manages to compromise one session, previous and future sessions may remain secure.

The double-helix structure 302 may provide inherent resistance to certain types of physical attacks. The three-dimensional nature of the structure and the precise positioning of emission points 306 may make it difficult for an eavesdropper to physically access or manipulate the quantum channel without detection, especially when implemented in integrated photonic chips or fiber-coupled architectures with shielding or tamper detection.

Real-time monitoring of quantum bit error rates (QBER) may be implemented to continuously assess the security of the quantum channel. Sudden increases in QBER may indicate the presence of an eavesdropper or channel disturbance, allowing the system to halt transmission or switch to a more secure communication mode.

Post-quantum cryptographic techniques may be incorporated to ensure that the system 300 remains secure even against attacks from future quantum computers. In some embodiments, the system 300 may hybridize QKD with post-quantum encryption algorithms such as lattice-based or code-based schemes to ensure resilience even if classical encryption is compromised in the future The system 300 may implement privacy amplification techniques to reduce any potential information leakage to an eavesdropper. After detecting errors that might indicate eavesdropping, the legitimate users may apply hash functions to their shared key material, effectively reducing an eavesdropper's knowledge of the final key to a negligible level.

The double-helix structure 302 (and/or the double-helix structure 102 of FIG. 1A) in some embodiments may be is constructed using nanofabrication or 3D printing technology. The double-helix structure 302 may have multiple layers of spiral loops. Each loop may represent one complete cycle of the double-helix structure 302, containing designated emission points 306 at regular intervals. The double-helix structure 302 may be defined by a helix radius, a helix pitch, and emission points 302. The helix radius is the radial distance from a central axis of the double-helix structure 302 and the helix chains 302A, 302B to any emission point on the helix chain 302A, 302B. The helix pitch is the axial distance between two corresponding points on successive loops or coils of each of the helix chains 302A, 302B. Stated another way, the helix pitch is the axial distance between adjacent loops or coils of each of the helix chains 302A, 302B. The emission points 306 are distributed along the helix path, e.g., along each of the helix chains 302A, 302B, from which photons may be emitted. Each emission point 306 may be uniquely defined by its spatial coordinates.

Although not illustrated in FIG. 3, the system 300 may further include a photon system, such as the photon system 112 of FIGS. 1A and 1D, that includes a quantum photon emitter. The quantum photon emitter, such as the quantum photon emitter 162 of FIG. 1D, may emit photons that each carries a quantum state, including an OAM state (e.g., 1=+1, −1, +2, −2, or the like), a polarization state (e.g., horizontal, vertical, left-circular, right-circular, or the like), and a phase state (e.g., 0, π/2, π, 3π/2, or the like). In some embodiments, each polarization state is associated with binary quantum information.

The photon system may further include a quantum state modulator, which may include one or more components to modulate the quantum state of each photon. In some embodiments, the quantum state modulator includes one or more of an OAM modulator (such as the OAM modulator 166 of FIG. 1D), a polarization modulator (such as the polarization modulator 168 of FIG. 1D), and/or a phase modulator (such as the phase modulator 164 of FIG. 1D). The OAM modulator may assign desired OAM states to the photons, e.g., using spatial light modulators (SLMs) or q-plates. The polarization modulator may include a polarization controller that manipulates each photon's polarization state before transmission. For example, the polarization modulator or controller may include a polarization beam-splitter (PBS), and electro-optic modulator (EOM), and/or other suitable polarization controller. The phase modulator may include a phase shifter or other suitable phase modulator to apply phase changes to the photons during their transmission such that each photon includes a desired or modulated phase state after leaving the photon system and/or the double-helix structure 302.

Photons having a desired composite state or encoding (e.g., spatial coordinates and composite quantum state) may be transmitted through a quantum channel such as fiber-optic or free-space quantum channels. The composite encoding involves a combination of the spatial coordinates of the emission point 306 and the composition quantum state of each photon (OAM, polarization, phase).

At the receiver 304, the spatial coordinate (x, y, z) of the emission point 306 of each photon may be detected to retrieve the classical information of each photon. A spatial detector array tracks the origin of each photon based on its emission point 306 along the double-helix structure 302, mapping it back to the corresponding classical bit value.

The composite quantum state may be measured using any suitable system or device, such as the mode sorter 134, the polarization analyzer 132, and/or the interferometer 136 of FIG. 1B. For example, the mode sorter 134 may include spiral phase plates or holographic plates to measure the OAM state of each photon, which OAM state may then be mapped to the appropriate quantum bit. The polarization analyzer 132 may include one or more PBSs and/or other detectors to measure the polarization state of each photon, which polarization state may then be mapped to the appropriate quantum bit (which may be a binary quantum bit in some embodiments). The interferometer 136 may include a phase-sensitive detector to measure the phase state of each photon and thereby decode the phase-shifted quantum information.

The classical spatial information and composite quantum state information of a given photon as detected by the receiver 304 may be combined to reconstruct a full transmitted message carried by the given photon. In general, each photon's position and quantum state may be mapped back to encoded information set during transmission.

FIG. 4 depicts a flowchart 400 of a method for secure quantum communication, arranged in accordance with at least one embodiment described herein. The method 400 may be programmably performed or controlled by a processor in, e.g., a computer and/or server coupled to a classical computing interface 122 of FIG. 1. In an example implementation, the method 400 may be performed in whole or in part by the system 100 of FIG. 1A under the control of a classical processor (coupled to the classical computing interface 122) and/or by the system 300 of FIG. 3 under the control of a classical processor (coupled to a corresponding classical computing interface). Some embodiments herein may include a non-transitory computer-readable storage medium that includes computer-executable instructions executable by a processor device to perform or control performance of any operations herein, such as the operations of the method 400 of FIG. 4. The method 400 may include one or more of blocks 402, 404, 406, and/or 408.

At block 402, the method 400 may include generating a photon. For example, the photon may be generated by the photon system 112, and/or particularly by the photon generation and control system 160 and/or the quantum photon emitter 162 of FIG. 1D. The generated photon may include a composite quantum state that includes two or more of its OAM state, its polarization state, and/or its phase state. Block 402 may be followed by block 404.

At block 404, the method 400 may include modulating OAM state, polarization state, and phase state of the photon to generate a desired composite quantum state of the photon. For example, the various quantum states of the photon may be modulated by the photon system 112, and/or particularly by the OAM modulator 166, the polarization modulator 168, and/or the phase modulator 164 of FIG. 1D. The desired quantum state includes the modulated OAM, polarization, and phase states of the photon. Block 404 may be followed by block 406.

At block 406, the method 400 may include directing the photon to a given emission point of multiple emission points on a double-helix structure. The given emission point may be associated with a given classical bit value to be encoded in the photon by emission of the photon from the given emission point. The given emission point includes a given spatial coordinate. For example, block 406 may include directing the given photon (e.g., received from the photon system 112 of FIGS. 1A and 1D) to a given one of the emission points 306 on the double-helix structure 302 of FIG. 3. Block 406 may be followed by block 408.

At block 408, the method 400 may include emitting the photon from the given emission point of the double-helix structure and into a quantum channel for transmission. The photon may be encoded with the composite quantum state and the given classical bit value.

In some embodiments, each emission point of the double-helix structure may be associated with a corresponding classical bit value. For example, a first classical bit value associated with a first emission point may be different than a second classical bit value associated with a second emission point.

Alternatively or additionally, the method 400 may further include receiving the photon at a receiver, such as the receiver 304 of FIG. 3. The method 400 may further include determining the given spatial coordinate of the given emission point as an emission point of the photon from the double-helix structure. The method 400 may further include measuring the OAM state of the photon, measuring the polarization state of the photon, and measuring the phase state of the photon. The method 400 may further include decoding information carried by the photon based on the given spatial coordinate, the OAM state, the polarization state, and the phase state.

In some embodiments, the method 400 further includes, prior to receiving the photon at the receiver, encoding redundant classical information and quantum information across two or more photons emitted from two or more of the emission points of the double-helix structure, the two or more photons including the photon emitted from the given emission point. The method 400 may further include using a quantum error correction code to detect and correct one or more transmission errors at the receiver. The quantum error correction code may include a Shor code, a Steane code, a surface code, or other quantum error correction code.

Alternatively or additionally, the method 400 may further include using a classical error correction code to detect, or to detect and correct, one or more transmission errors in classical information of two or more photons received from the double-helix structure at the receiver, the two or more photons including the photon emitted from the given emission point. The classical error correction code may include a Reed-Solomon code or other classical error correction code.

In some embodiments, the photon is one of two or more photons emitted from two or more of the emission points of the double-helix structure. In this and other embodiments, composite quantum states of the two or more photons may be used to generate a secure quantum key for communication between the receiver and a sender that includes the double-helix structure. The secure quantum key may be generated from the composite quantum states of the two or more photons according to a QKD protocol. The QKD protocol may include the BB84 protocol or the E91 protocol.

Alternatively or additionally, the method 400 may further include generating multiple photons. The method 400 may further include modulating OAM state, polarization state, and phase state of each of the photons independently. The method 400 may further include randomizing emission points of the double-helix structure to which the photons are directed. The method 400 may further include emitting the photons from the randomized emission points and into the quantum channel for transmission. Randomization of emission points may prevent potential attackers from predicting a transmission pattern, which may further secure the quantum communication method.

FIG. 5 depicts a flowchart 500 of another method for secure quantum communication, arranged in accordance with at least one embodiment described herein. The method 500 may be programmably performed or controlled by a processor in, e.g., a computer and/or server coupled to the classical computing interface 122 of FIG. 1. In an example implementation, the method 500 may be performed in whole or in part by the system 100 of FIG. 1A under the control of a classical processor (coupled to the classical computing interface 122) and/or by the system 300 of FIG. 3 under the control of a classical processor (coupled to a corresponding classical computing interface). Some embodiments herein may include a non-transitory computer-readable storage medium that includes computer-executable instructions executable by a processor device to perform or control performance of any operations herein, such as the operations of the method 500 of FIG. 5. The method 500 may include one or more of blocks 502, 504, 506, 508, and/or 510.

At block 502, the method 500 may include generating a photon. For example, the photon may be generated by the photon system 112, and/or particularly by the photon generation and control system 160 and/or the quantum photon emitter 162 of FIG. 1D. The generated photon may include a composite quantum state that includes two or more of its OAM state, its polarization state, and/or its phase state. Block 502 may be followed by block 504.

At block 504, the method 500 may include encoding information in the photons using a combination of spatial coordinates and composite quantum states of the photons. Block 504 may include one or more of blocks 506, 508, and/or 510.

At block 506, the method 500 may include assigning classical information to emission points distributed along helix chains of a double-helix structure, each emission point having a unique spatial coordinate. Block 506 may be followed by block 508.

At block 508, the method 500 may include modulating composite quantum states of the photons, each composite quantum state including OAM state, polarization state, and phase state of a corresponding photon. Block 508 may be followed by block 510.

At block 510, the method 500 may include emitting the photons with modulated composite quantum states from selected emission points each having assigned classical information.

In some embodiments, the method 500 may further include implementing quantum error correction on the quantum states, implementing classical error correction on the spatial coordinates, and/or implementing a QKD protocol using the combination of spatial coordinates and quantum states.

While the embodiments described above primarily illustrate a double-helix or helical structure for the spatial emission architecture, it is explicitly contemplated that other spatial arrangements including linear chains, planar grids, radial layouts, circular loops, spiral arms, and/or arbitrary 2D or 3D arrays may be employed to support the same composite encoding principles. Each emission point in these alternative geometries or arrangements may remain uniquely identifiable by spatial coordinate and independently addressable via the system's control module. These alternatives may offer compatibility with planar photonic platforms or chip-scale integration, while maintaining support for the spatial-to-bit encoding and decoding operations disclosed herein.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The subject technology of the present disclosure is illustrated, for example, according to various aspects described below. Various examples of aspects of the present disclosure are described as numbered examples (1, 2, 3, etc.) for convenience. These are provided as examples and do not limit the present disclosure. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example The following is a non-limiting summary of some example implementations presented herein.

Example 1. A method for secure quantum communication, comprising:

US 12,647,260 B2

29 generating a photon;
modulating at least two quantum state dimensions selected from the group consisting of orbital angular momentum (OAM), polarization, and phase of the photon to form a composite quantum state;
directing the photon to an emission point on a helical structure having a defined spatial coordinate corresponding to classical data; and
emitting the photon from the emission point into a quantum channel;
wherein the composite quantum state and spatial coordinate together encode secure information.

Example 2. The method of any example herein, particularly of example 1, wherein the helical structure comprises a double-helix geometry defined by a helix radius and pitch, and includes multiple discrete emission points distributed along its surface.

Example 3. The method of any example herein, particularly of any one of examples 1 or 2, wherein the spatial coordinate encodes a classical bit, and wherein the emission point is dynamically selected based on information content.

Example 4. The method of any one of examples 1-3, further comprising:
detecting the emitted photon at a receiver;
decoding the classical data from the spatial coordinate of the emission point;
decoding the composite quantum state from at least one of the OAM, polarization, or phase measurement.

Example 5. The method of any example herein, particularly of example 4, further comprising applying a classical error correction code to the classical data and a quantum error correction code to quantum data encoded in the composite quantum state.

Example 6. The method of any example herein, particularly of example 5, wherein the quantum error correction code comprises a Shor code, a Steane code, or a surface code.

Example 7. The method of any example herein, particularly of any one of examples 5 or 6, wherein the classical error correction code comprises a Reed-Solomon code.

Example 8. The method of any one of examples 1-7, wherein emission points are randomized among helical positions to introduce spatial entropy for key distribution protocols.

Example 9. The method of any example herein, particularly of any one of examples 1-8, further comprising generating a secure quantum key from two or more photons emitted from emission points of the helical structure for secure communication between a receiver and a sender that includes the helical structure.

Example 10. The method of any example herein, particularly of example 9, wherein the secure quantum key is generated according to a quantum key distribution protocol that includes the BB84 quantum key distribution protocol or the E91 quantum key distribution protocol.

Example 11. A quantum communication system, comprising:
a photon source configured to emit single photons;
at least one modulator configured to adjust two or more quantum state dimensions selected from orbital angular momentum (OAM), polarization, and phase;
a helical structure having a plurality of emission points with unique spatial coordinates;
a control module for selecting emission points based on classical data mapping; and
a receiver configured to extract classical and quantum information from received photons.

Example 12. The system of any example herein, particularly of example 11, wherein the helical structure is fabricated from a photonic-compatible material selected from the group consisting of silicon nitride, lithium niobate, fused silica, and glass.

Example 13. The system of any example herein, particularly of any one of examples 11 or 12, wherein the control module dynamically adjusts emission point selection according to a pseudorandom sequence synchronized between sender and receiver.

Example 14. The system of any example herein, particularly of any one of examples 11-13, wherein quantum key distribution is performed using an extended BB84 protocol combining polarization basis selection and spatial encoding.

Example 15. The system of any example herein, particularly of any one of examples 11-14, wherein the receiver includes a spatial decoding module, an OAM mode sorter, a polarization analyzer, and an interferometric phase detector.

Example 16. The system of any example herein, particularly of any one of examples 11-15, wherein the helical structure includes multiple parallel helix chains operating as separate quantum channels under a shared control module.

Example 17. The system of any example herein, particularly of any one of examples 11-16, wherein each spatial coordinate encodes a classical bit, and wherein the control module is configured to dynamically select an emission point for each photon based on information content.

Example 18. A method for secure quantum communication, the method comprising:
generating a photon;
modulating orbital angular momentum (OAM) state, polarization state, and phase state of the photon to generate a desired composite quantum state of the photon;
directing the photon to a given emission point of a plurality of emission points on a double-helix structure, wherein the given emission point is associated with a given classical bit value to be encoded in the photon by emission of the photon from the given emission point and the given emission point includes a given spatial coordinate; and
emitting the photon from the given emission point of the double-helix structure and into a quantum channel for transmission, the photon encoded with the desired composite quantum state and the given classical bit value.

Example 19. The method of an example herein, particularly of example 18, wherein each emission point of the plurality of emission points is associated with a corresponding classical bit value, wherein a first classical bit value associated with a first emission point of the plurality of emission points is different than a second classical bit value associated with a second emission point of the plurality of emission points.

Example 20. The method of any example herein, particularly of any one of examples 18 or 19, further comprising:
receiving the photon at a receiver;
determining the given spatial coordinate of the given emission point as an emission point of the photon from the double-helix structure;
measuring the OAM state of the photon;
measuring the polarization state of the photon;
measuring the phase state of the photon; and
decoding information carried by the photon based on the given spatial coordinate, the OAM state, the polarization state, and the phase state.

Example 21. The method of any example herein, particularly of example 20, further comprising:

encoding redundant classical information and quantum information across two or more photons emitted from two or more of the plurality of emission points of the double-helix structure, the two or more photons including the photon emitted from the given emission point; and using a quantum error correction code to detect and correct one or more transmission errors at the receiver.

Example 22. The method of any example herein, particularly of example 21, wherein the quantum error correction code comprises a Shor code, a Steane code, or a surface code.

Example 23. The method of any example herein, particularly of any one of examples 20-22, further comprising using a classical error correction code to detect, or to detect and correct, one or more transmission errors in classical information of two or more photons received from the double-helix structure at the receiver, the two or more photons including the photon emitted from the given emission point.

Example 24. The method of any example herein, particularly of example 23, wherein the classical error correction code comprises a Reed-Solomon code.

Example 25. The method of any example herein, particularly of any one of examples 20-24, wherein:

the photon is one of two or more photons emitted from two or more of the plurality of emission points of the double-helix structure; and composite quantum states of the two or more photons are used to generate a secure quantum key for communication between the receiver and a sender that includes the double-helix structure.

Example 26. The method of any example herein, particularly of example 25, wherein the secure quantum key is generated from the composite quantum states of the two or more photons according to a quantum key distribution protocol.

Example 27. The method of any example herein, particularly of example 26, wherein the quantum key distribution protocol includes the BB84 protocol or the E91 protocol.

Example 28. The method of any example herein, particularly of any one of examples 18-27, further comprising:

generating a plurality of photons;

modulating OAM, polarization state, and phase of each of the plurality of photons independently;

randomizing emission points of the double-helix structure to which the plurality of photons are directed; and emitting the plurality of photons from the randomized emission points and into the quantum channel for transmission.

Example 29. A quantum communication system, comprising:

a photon source configured to generate photons;

an orbital angular momentum (OAM) modulator configured to modulate OAM state of the photons;

a polarization modulator configured to modulate polarization state of the photons;

a phase modulator configured to modulate phase state of the photons;

a double-helix structure comprising a plurality of emission points, each emission point having a specific spatial coordinate and associated with classical information; and a control system configured to direct the photons to the emission points on the double-helix structure for transmission through a quantum channel, each photon encoded with a composite quantum state that includes its OAM state, polarization state, and phase state and classical information corresponding to an emission point from which the photon is emitted.

Example 30. The system of any example herein, particularly of example 29, further comprising a remote receiver, the remote receiver comprising:

a spatial data decoder array configured to detect the spatial coordinate of the emission point of each received photon;

a mode sorter configured to detect the OAM of each received photon;

a polarization analyzer configured to detect the polarization state of each received photon; and an interferometer configured to detect the phase of each received photon.

Example 31. The system of any example herein, particularly of example 30, wherein the remote receiver comprises a readout subsystem module configured to decode information carried by each photon based on the detected spatial coordinate of the emission point, the detected OAM, the detected polarization state, and the detected phase of the photon.

Example 32. The system of any example herein, particularly of any one of examples 30-31, wherein the received photons are encoded with redundant classical information and quantum information, the system further comprising a quantum error correction system configured to detect and correct one or more transmission errors using a quantum error correction code.

Example 33. The system of any example herein, particularly of example 32, wherein the quantum error correction code comprises a Shor code, a Steane code, or a surface code.

Example 34. The system of any example herein, particularly of any one of examples 30-33, wherein the control system and the remote receiver are configured to generate a secure quantum key from composite quantum states of two or more photons according to a quantum key distribution protocol.

Example 35. The system of any example herein, particularly of any one of examples 29-34, further comprising a classical error correction system configured to detect, or to detect and correct, errors in classical information encoded in the spatial coordinates.

Example 36. A method for secure quantum communication, the method comprising:

generating photons; and encoding information in the photons using a combination of spatial coordinates and composite quantum states of the photons, including:

assigning classical information to a plurality of emission points distributed along helix chains of a double-helix structure, each emission point having a unique spatial coordinate;

modulating composite quantum states of the photons, each composite quantum state including orbital angular momentum (OAM) state, polarization state, and phase state of a corresponding photon; and emitting the photons with modulated composite quantum states from selected emission points each having assigned classical information.

Example 37. The method of any example herein, particularly of example 36, further comprising at least one of:

implementing quantum error correction on the quantum states;

US 12,647,260 B2

33 implementing classical error correction on the spatial coordinates; or implementing a quantum key distribution protocol using the combination of spatial coordinates and quantum states.

The invention claimed is:

1. A method for secure quantum communication, comprising:

generating a photon;

modulating at least two quantum state dimensions selected from the group consisting of orbital angular momentum (OAM), polarization, and phase of the photon to form a composite quantum state;

directing the photon to an emission point on a structure having a defined spatial coordinate corresponding to classical data; and emitting the photon from the emission point into a quantum channel;

wherein the composite quantum state and spatial coordinate together encode secure information.

2. The method of claim 1, wherein the structure comprises a double-helix geometry defined by a helix radius and pitch, and includes multiple discrete emission points distributed along its surface.

3. The method of claim 1, wherein the spatial coordinate encodes a classical bit, and wherein the emission point is dynamically selected based on information content.

4. The method of claim 1, further comprising:

detecting the emitted photon at a receiver;

decoding the classical data from the spatial coordinate of the emission point;

decoding the composite quantum state from at least one of the OAM, polarization, or phase measurement.

5. The method of claim 4, further comprising applying a classical error correction code to the classical data and a quantum error correction code to quantum data encoded in the composite quantum state.

6. The method of claim 5, wherein the quantum error correction code comprises a Shor code, a Steane code, or a surface code.

7. The method of claim 5, wherein the classical error correction code comprises a Reed-Solomon code.

8. The method of claim 1, wherein emission points are randomized among positions on the structure to introduce spatial entropy for key distribution protocols.

9. The method of claim 1, further comprising generating a secure quantum key from two or more photons emitted from emission points of the structure for secure communication between a receiver and a sender that includes the structure.

10. The method of claim 9, wherein the secure quantum key is generated according to a quantum key distribution protocol that includes the BB84 quantum key distribution protocol or the E91 quantum key distribution protocol.

11. The method of claim 9, wherein the secure quantum key is generated using a measurement device independent quantum key distribution (MDI-QKD) protocol in a system that comprises a sender, a receiver, and an untrusted relay node configured to perform Bell-state measurements on photons received from the sender and the receiver, and wherein the sender and receiver generate shared keys based on the measurement outcomes.

12. The method of claim 9, wherein the secure quantum key is generated according to a quantum key distribution protocol that includes a continuous-variable quantum key distribution (CV-QKD) protocol and the CV-QKD protocol includes encoding information in quadrature components of an electromagnetic field of the photon.

13. A quantum communication system, comprising:

a photon source configured to emit single photons;

at least one modulator configured to adjust two or more quantum state dimensions selected from orbital angular momentum (OAM), polarization, and phase;

a structure having a plurality of emission points with unique spatial coordinates;

a control module for selecting emission points based on classical data mapping; and a receiver configured to extract classical and quantum information from received photons.

14. The system of claim 13, wherein the structure is fabricated from a photonic-compatible material selected from the group consisting of silicon nitride, lithium niobate, fused silica, and glass.

15. The system of claim 13, wherein the control module dynamically adjusts emission point selection according to a pseudorandom sequence synchronized between sender and receiver.

16. The system of claim 13, wherein quantum key distribution is performed using an extended BB84 protocol combining polarization basis selection and spatial encoding.

17. The system of claim 13, wherein the receiver includes a spatial decoding module, an OAM mode sorter, a polarization analyzer, and an interferometric phase detector.

18. The system of claim 13, wherein the structure includes multiple parallel helix chains operating as separate quantum channels under a shared control module.

19. The system of claim 13, wherein each spatial coordinate encodes a classical bit, and wherein the control module is configured to dynamically select an emission point for each photon based on information content.

20. The system of claim 13, wherein the plurality of emission points are arranged linearly, in a planar grid, radially, along a spiral path, or along a circular path.

* * * * *